United States Patent [19]

Wilder

[11] 4,072,928
[45] Feb. 7, 1978

[54] INDUSTRIAL SYSTEM FOR INSPECTING AND IDENTIFYING WORKPIECES

[75] Inventor: Joseph Wilder, Princeton, N.J.

[73] Assignee: Sangamo Weston, Inc., Springfield, Ill.

[21] Appl. No.: 621,638

[22] Filed: Oct. 10, 1975

[51] Int. Cl.[2] .............................................. G06K 9/00
[52] U.S. Cl. ................. 340/146.3 H; 340/146.3 MA; 340/146.3 AC
[58] Field of Search ............. 340/146.3 MA, 146.3 H, 340/146.3 R, 146.3 SY, 146.3 AC; 235/151.1, 151.11, 151.3; 444/1

[56] References Cited

U.S. PATENT DOCUMENTS

| 3,701,095 | 10/1972 | Yamaguchi et al. ....... 340/146.3 MA |
| 3,781,798 | 12/1973 | Hinks ............................ 340/146.3 R |
| 3,815,090 | 6/1974 | Muenchhausen ......... 340/146.3 MA |
| 3,959,771 | 5/1976 | Uno et al. ...................... 340/146.3 H |
| 3,967,241 | 6/1976 | Kawa ............................. 340/146.3 H |
| 3,967,242 | 6/1976 | Isoo et al. ..................... 340/146.3 H |

*Primary Examiner*—Leo H. Boudreau

[57] ABSTRACT

Disclosed is a system for inspecting and identifying workpieces in an industrial environment. Workpieces such as metal parts with markings that are punch-stamped or engraved are successively registered with a device which derives an electrical signal corresponding to each marking. The markings can be serial numbers or any other markings of arbitrary shape. Each electrical signal is extensively modified to minimize the effect of irrelevant and confusing characteristics such as the surface roughness of the workpiece, rust spots, depth of the stamping or engraving, and the like, and to make the electrical signal more representative of the important characteristics of the marking, such as the overall shape of the marking and the differences of the marking from other markings which have different meanings. The resulting modified electrical signal is combined with prototype electrical signals to find out which of the prototype signals most closely corresponds to the modified electrical signal, and to thereby identify the marking from which the modified electrical signal is derived. The prototype electrical signals are generated through training the system by exposing it to sample markings that are of the general type of the markings on the workpieces that will be ultimately inspected. The training of the system is similar to the normal, inspecting operation of the system, and can be done by relatively unskilled operators. This system can be retrained, again by relatively unskilled operators, for inspection of different types of markings or of different types of workpieces.

46 Claims, 18 Drawing Figures

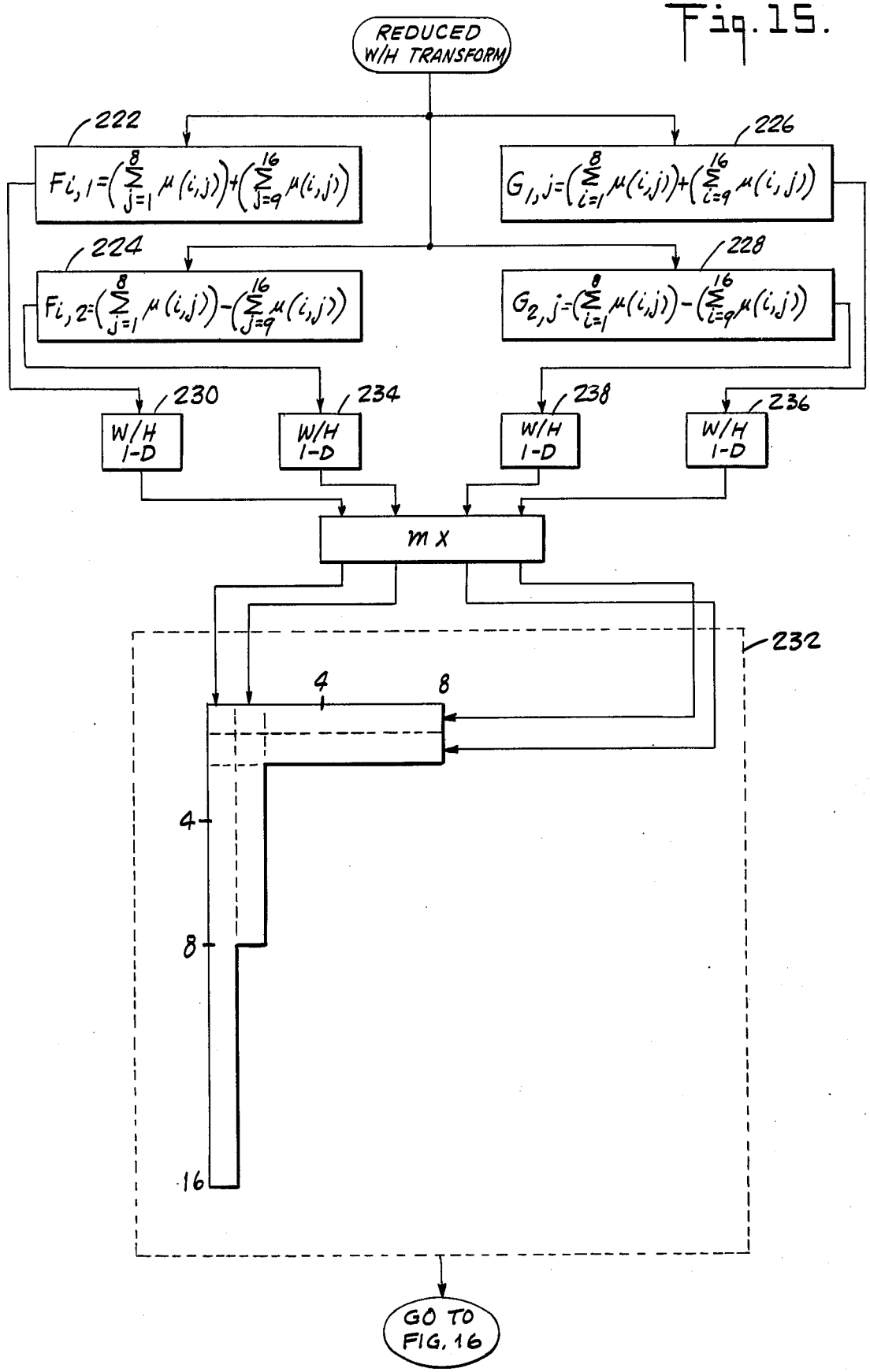

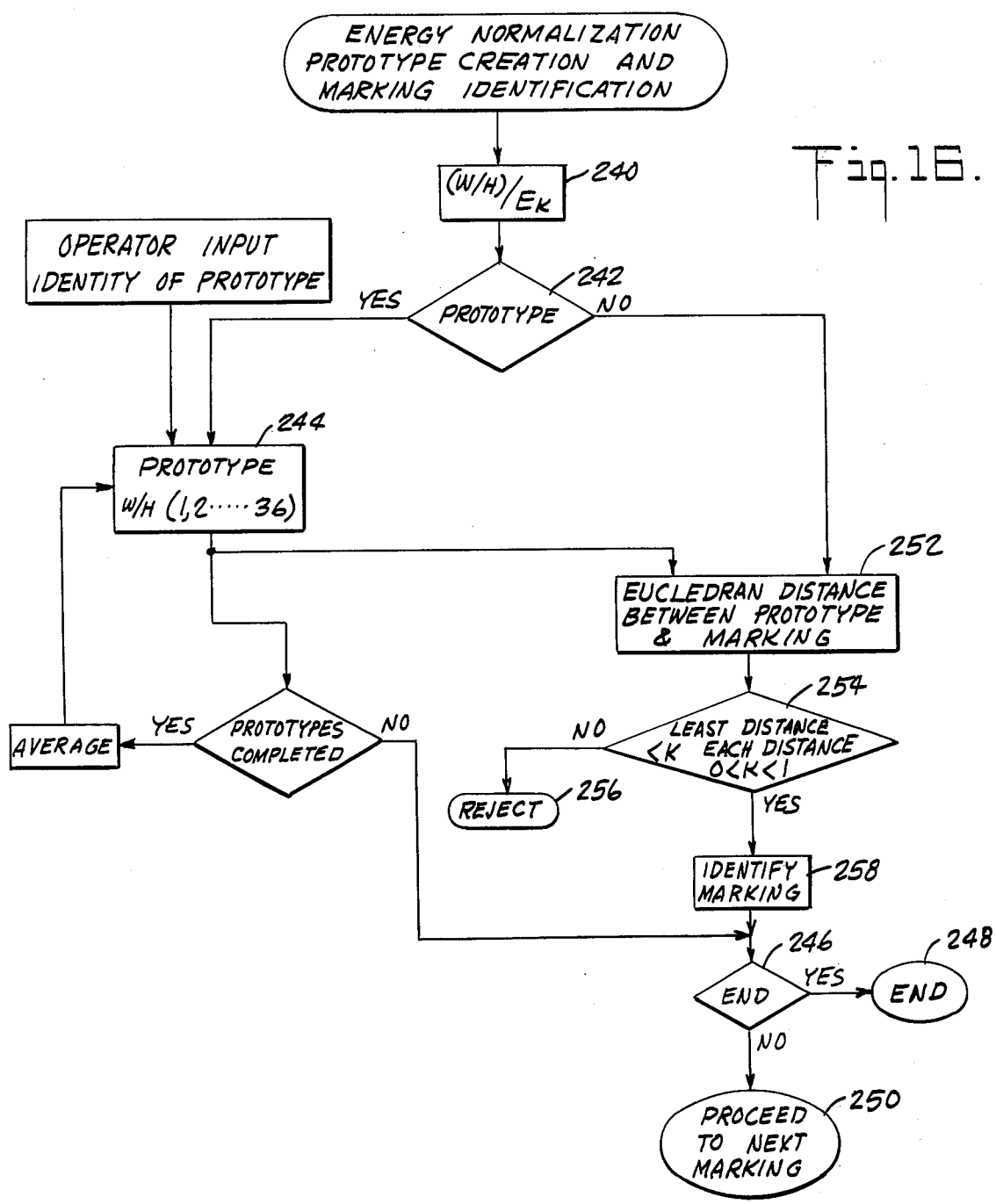

INDUSTRIAL SYSTEM FOR INSPECTING AND IDENTIFYING WORKPIECES

BACKGROUND OF THE INVENTION

The invention is in the field of article and workpiece handling, and more specifically in the field of article and workpiece inspection and identification.

It is often desirable to identify articles and workpieces by punch-stamping or engraving markings into the article and workpiece, or by otherwise affixing markings thereto. For example, when handguns are manufactured serial numbers are punch-stamped or engraved on several different metal parts at the time the parts are made. In the process of assembling the parts into a handgun it may be desirable (perhaps even required) to record the serial numbers of the various components and the serial number of the assembled handgun. This is typically done at present by manually reading each serial number, which is time consuming and prone to error, partly because of the unavoidable fatigue from repetitive work. As another example, when fuel rods for nuclear reactors are handled, it is typically required to keep careful records of the stamped or engraved serial numbers of the rods. This may necessitate frequent manual reading of such serial numbers, with the associated difficulties of safely handling the nuclear material. Similarly, in other assembling operations it may be desirable to keep track of various markings that have been punch-stamped, engraved or otherwise formed on workpieces.

While some markings can be detected and identified by a machine, for example by mechanical or electrical brushes or by prior art character recognition machines, this is not always practicable or possible. For example, if markings are to be detected and identified by mechanical or electrical brushes, the markings must have special characteristics which in many cases may not be practicable to implement. In the example of serial numbers punch-stamped or engraved into metal parts, it is typically not possible to read the markings by such electrical or mechanical brushes with acceptable accuracy because of the relatively small size of the markings and because of the relatively low contrast between the background and the marking. In some cases character recognition machines of the type used to read printed material may be used to read markings on workpieces, but such machines require special type fonts and clear contrast between the marking and the background. Therefore, while such machines may be used in certain situations, such as when detecting and identifying certain special types of printed labels and the like, they are not useful in the typical industrial situation, where markings such as serial numbers are punch-stamped or engraved into workpieces or the workpieces are provided with other markings which are not uniform or well defined and which are on a low contrast background. In one prior art example (U.S. Pat. No. 3,810,159) raised markings on tires are read by a machine, but only by either heating or cooling the tire so as to get differential infrared radiation as between the marking and the background. For such reasons, it has not been possible in the prior art to satisfactorily detect and identify low contrast markings of the type typically used in an industrial environment despite the need to do so in order to increase the control over a given manufacturing or assembly processes and in order to reduce labor costs.

SUMMARY OF THE INVENTION

The invention is in the field of industrial processes which require inspecting and identifying articles or workpieces provided with markings, and is particularly useful in inspecting and identifying markings which are difficult to distinguish from the background, such as markings punch-stamped or engraved into metal or other parts and other markings which are not readily distinguishable by conventional techniques from their background.

In practicing the invention, successive articles or workpieces with such markings are registered with an inspection position where their markings are inspected to derive an electrical signal corresponding to each inspected marking. Each of these electrical signals is extensively modified to make it less responsive to irrelevant or confusing factors (such as lack of clarity of portions of the inspected markings, surface defects or irregularities of the article or workpiece and the like) and to make it more responsive to those characteristics of the inspected marking which are of true interest, i.e., those characteristics of a marking which make it similar to other markings having the same meaning and different from other markings having different meanings. Each resulting modified electrical signal is combined with prototype signals similarly derived from known prototype markings. The purpose of this combining is to detect the correspondence between the modified and prototype signals, and to thus find which one of the prototype markings most closely corresponds to the inspected marking and identify the inspected marking. The invented system uses techniques and approaches which make it possible not only to inspect and identify markings which could not be identified by prior art systems, but also make it possible to inspect and identify markings with better accuracy than the typical accuracy associated with the manual reading of such markings.

An exemplary embodiment of the invention works with workpieces which have markings defined by surface irregularities of the workpiece material. As one example, the workpieces may be manufactured metal parts, and the surface irregularities defining the markings thereon may be punch-stamped, die-stamped or engraved serial numbers. Successive workpieces are registered with an inspection position, and the markings of each registered workpiece are detected to derive an electrical signal corresponding to each marking. Each of these electrical signals is extensively modified to make it more representative of those characteristics of the scanned marking which make it similar to other markings intended to have the same meaning and which make it different from other markings intended to have different meanings. The resulting modified electrical signal is combined with prototype electrical signals representing similar characteristics of prototype markings for each of the possible markings that may be on the workpiece. The prototype electrical signals are derived by going through the same process with prototype markings while indicating to the system the known identity of each prototype marking.

The system is not limited to inspecting and identifying a single type of marking and may be trained by relatively unskilled operators to work with completely different types of markings. Moreover, the system may be trained to work with a given type marking with a certain number of sample markings, and, if it does not subsequently inspect and identify new markings with sufficient accuracy, it may be further trained with additional sample markings to improve its overall accuracy.

In a more specific embodiment of the invention, each marking of a workpiece is registered with an inspection position and is scanned to derive an electrical signal representing a type of a raster scan of the marking. The resulting electrical signal indicates the detected light intensity or brightness at each point of an array of points overlapping the marking. This electrical signal is smoothed in accordance with the invention to reduce the effect of certain irrelevant or confusing factors, such as undue local variations in brightness due to a small spot that is too shiny or too dark, nonuniformity in the light illuminating the scanned area, local nonuniformity of the detecting device, the other sources of spatial or temporal noise. The smoothing is done in a manner which is particularly suited to the environment in which the invented system works and to the types of noise sources typically encountered in such environment. The resulting smoothed electrical signal is quantized into a ternary level signal to provide a quantized electrical signal that further reduces the effects of irrelevant or confusing factors and enhances the distinguishing characteristics of the scanned marking. The ternary level quantization, which is used in accordance with the invention, provides a quantized signal responding to the changes in the smoothed signal rather than to the smoothed signal itself. More specifically, in the ternary quantization the smoothed electrical signal is examined for transitions between levels rather than for levels, and one ternary level is assigned for a sharp change from low to high, another ternary level is assigned for a sharp change from high to low, and a third ternary level is assigned for the lack of either change. The parameters for what is considered a sharp change and for what is considered the lack of a change are selected, in accordance with the invention, to reflect the environment in which the invented system operates. As a result, factors which would have adversely affected a standard binary system have little adverse effect in the invented system. Such factors including the following: variations in the absolute level of illumination from marking to marking, variations in the background of the markings from marking to marking, or from one portion of a marking to another, changes in electrical signal level resulting from the finite resolution of the scan (e.g., a thin marking may not provide a sufficient signal to exceed a threshold level in a standard binary system but would provide a sufficient signal change to be detected in accordance with this invention). The ternary level quantization is particularly significant in this invention; the inventor herein has estimated that in the environment of this invention a ternary quantization provides approximately one and a half times as much information about a marking than binary quantization under the same conditions. The quantized signal representing a marking is then transformed to derive a transformed signal representing selected aspects only of the corresponding marking rather than the marking itself. It has been found, in accordance with the invention, that considerably better results are obtained when only certain aspects of a marking are considered rather than the brightness at each point of the marking, and it has been found that certain selected transforms of the scan signal are better than the scan signal itself. One transformation, which has been found particularly suited to the environment of this invention, is a special type Walsh-/Hadamard transformation which involves multielement matrix transformation, and particularly selected additions and subtractions of components of the quantized signal. As a result of the transformation, the relatively correlated quantized signal components are converted into relatively uncorrelated transformed signal components, thus providing a transformed signal which, for a given reduced number of components, more clearly distinguishes a given marking from similar transformed signals representing markings of different meaning. Moreover, each component of the transformed signal includes a contribution from every component of the quantized signal, whereby the effect of noise on the individual quantized signal components tends to be averaged out and minimized. Before or after the transformation, or partly before and partly after the transformation, the signal is energy normalized to further reduce the effect of irrelevant and confusing factors and to further enhance the effect of the important characteristics of the inspected marking. For example, the energy normalization in accordance with the invention reduces the effect of the difference between markings which have the same meaning but one is somewhat heavier than the other, or one marking is stamped or raised more than the other, or the two markings differ somewhat in size. Note that the transformation of the quantized signal is an energy preserving operation so that the energy normalization and the transformation can coact constructively. The resulting transformed signal is further modified by extracting selected components thereof representing only selected features of the inspected marking which have been found in accordance with the invention to be the most significant features identifying the inspected markings. This extraction enhances the system in two different ways: the identification of a marking can be done more rapidly when each marking is characterized by fewer features and hence by fewer components of the transformed signal, and the inclusion of more features and more components may mean the inclusion of features and components which are less relevant to the important characteristics of a marking and may blur the distinction between different markings rather than enhance the uniqueness of a marking. The resulting extracted signal is combined with prototype signals derived from sample markings to which the system has been previously exposed. The purpose of the combining is to detect correspondence between the extracted signal and the prototype signals so as to identify the marking from which the extracted signal has been derived. The prototype signals are generated through training the system. More specifically, a number of sample markings which are the same, or of the same type, as the markings which will be ultimately inspected are exposed to the system. As each sample marking is registered with the inspection position, a manual input is provided identifying the marking so that the extracted signal can be stored as a prototype signal at an appropriate location. The successive prototype signals for markings that have the same meaning are averaged. After a sufficient number of sample markings have been exposed to the system, each of the resulting prototype signals is sufficiently representative of the likely variations as between markings which have the same meaning, and the actual inspection of new markings can then proceed as described above. If at a later time different type markings have to be identified, the system is retrained in the same manner but using the new and different type markings to generate prototype signals. Moreover, if the accuracy is not found to be adequate at any time, the system may be further trained, with the marking that it has failed to identify well, for use as additional sample markings.

BRIEF DESCRIPTION OF THE DRAWINGS

FIG. 15 is a flow chart illustrating the derivation of a special type of a reduced Walsh/Hadamard transform.

FIG. 16 is a flow chart illustrating the forming of signals and the identifying of a marking.

DETAILED DESCRIPTION

The invented system is primarily intended for use in an industrial environment, where the important characteristics are accuracy and the ability to inspect and identify workpieces with markings which are not very uniform, not very well defined against the background and which will perhaps change in kind from time to time. The invented system works successfully in such difficult environments, where conventional character recognition machines can not work satisfactorily. The success of the invented system is due to using new approaches that have been found to be particularly suited to such environment, and to using new combinations of approaches which have been found to enhance each other. By such new approaches and new combinations of approaches, the invented system is able to suppress the confusing and irrelevant features of a marking and to enhance the significant features of a marking so as to accurately detect and identify each marking.

The system works with workpieces having markings that are typically formed of the same material as the workpiece, but can also work with markings which may be otherwise affixed to the workpiece. The term workpiece typically refers here to a manufactured workpiece such as a metal part (e.g., a handgun barrel or a nuclear fuel rod) but also refers to other articles that may be handled in the course of an industrial or similar process.

Figure 1:
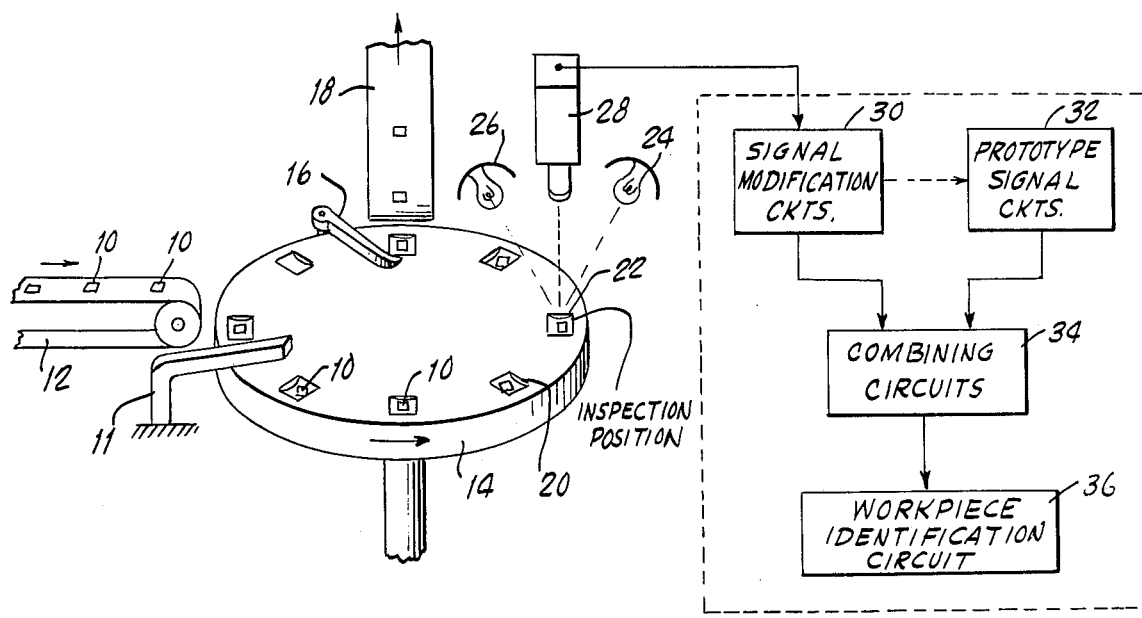
FIG. 1 illustrates the invented system partly in a perspective view and partly in a schematic view.

Referring to FIG. 1, workpieces 10 are delivered by a conveyor 12 moving in the indicated direction to a turntable 14 which is advanced step-wise in the indicated direction of rotation by suitable pneumatic means. After a newly complete circle with the turntable 14, each workpiece delivered to the turntable is removed therefrom by a guide 16 and deposited onto another workpiece conveyor 18 which moves the workpieces unloaded from the turntable 14 toward the next processing station. The conveyors 12 and 18 can be any conventional industrial conveyors suitable for the workpieces to be conveyed, and the turntable 14 can be advanced step-wise by a conventional pneumatic mechanism. The turntable 14 has around its periphery a circumferential row of bins 20, each shaped to receive a workpiece such that the workpiece is in a fixed orientation with respect to the turntable 14 and the markings of the workpiece in the bin face up are at a selected position with respect to the bin. The bins 20 are symetrically disposed with respect to the axis of rotation and to the surface of the turntable 14, so that the markings of the workpiece 10 and a bin 20 which is at an inspection position 22 are always at the same position and orientation. A guide 11 may be used to force into the respective bins 20 the workpiece 10 deposited thereon by the conveyor 12. The inspection position 22 is illuminated by suitable light sources 24 and 26, and the markings of the workpiece 10 which is at the inspection position 22 are detected by an imaging device 28 which derives an electrical signal corresponding to each marking registered with the inspection position 22, and supplies the electrical signal to circuits for modifying the signal and for combining the modified signal with prototype signals so as to identify the workpiece which is at the inspection position 22. These circuits include signal modification circuits 30, prototype signal circuits 32, combining circuits 34, and workpiece identification circuits 36.

Figure 2:
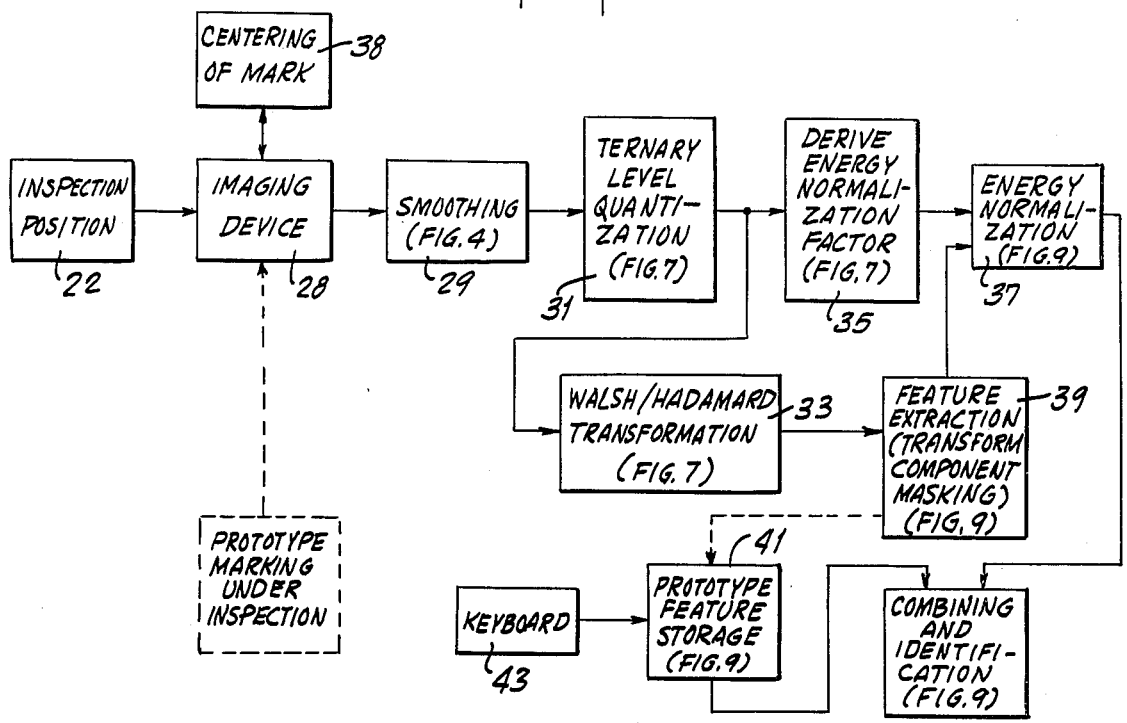
FIG. 2 is a block diagram illustrating the major portions of the invention.

Referring to FIG. 2 for a more detailed description of individual portions of the invented system, the imaging device 28 detects each marking registered with the inspection position 22 and derives an electrical signal representing the marking. This electrical signal includes a component for each point of a multipoint array which overlaps the marking. The imaging device 28 derives this signal by a type of a raster scan of the marking or of an image of the marking. The imaging device 28 may be the optical data digitizer - Model 658/659 Series made by Schlumberger/EMR Photoelectric. Such devices form the binary equivalent of the quantized intensity values of a two-dimensional array of sample points overlapping the optical image of the marking registered with the inspection position, and as used in this invention provide a signal component representing the brightness at each point of a multipoint array overlapping the marking registered with the inspection position 22. The imaging device may use an Image Dissector or a Vidicon type sensor. The Image Dissector provides these intensity values by scanning the image with an aperture, while the Vidicon type sensor scans the image of the marking with an electron beam. The image dissector provides real-time, random-access scanning, i.e., any point in the field of the scanner may be accessed by the scanner at any stage of the recognition process. The Vidicon-type scanner deposits a block of data from the scanner field into a storage device and all data is acquired from this storage device in subsequent stages of the recognition process. Other types of random access or storage-type scanners can be used instead of image dissector or Vidicon-type scanners. In either case, the signal provided from the image device 28 represents the marking registered with the inspection position 22 and includes a component for each point of a multipoint array which overlaps the marking.

In certain cases the marking which is at the inspection position 22 may be so well registered with the imaging device 28 that the imaging device can derive a sufficiently representative array of points overlapping the registered marking without the need to better center the registered marking with respect to the imaging device. In some cases, however, because of production tolerances in forming the markings (which may result in variations of marking positions from workpiece to workpiece), or because of other reasons it may be desirable or necessary to adjust the centering of the marking which is being inspected with respect to the imaging device 28. Such centering is carried out by a marking centering device 38 which carries out either mechanical or electronic centering. In mechanical centering, the position of each workpiece 10 which is at the inspection position 22 may be adjusted in suitable mechanical Verniers such that the marking thereof under inspection is at a finely adjusted position with respect to the imaging device 28. Alternately, the position of the imaging device 28 with respect to the inspection position 22 may be similarly adjusted. In electronic centering, the imaging device 28 looks at a field which is considerably larger than the marking under inspection, finds the actual position and orientation of the marking within that field, and then scans only the found marking position to derive the electrical signal representing the marking.

Figure 3:
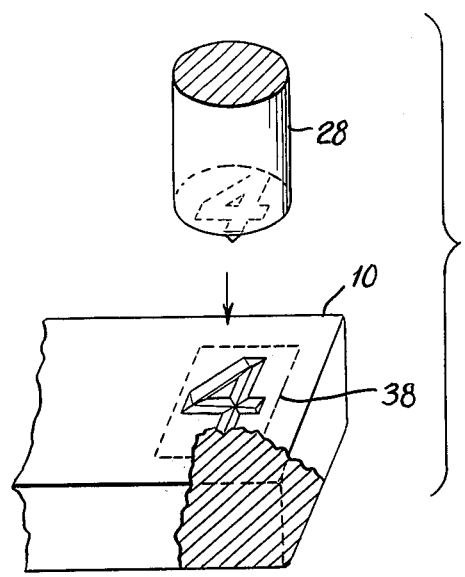
FIG. 3 is a partly broken perspective view illustrating the detection of a typical marking.

The output of the imaging device, with or without marking centering, is the binary equivalent of the quantized intensity values of the two-dimensional array of sample points overlapping the optical image of the inspected marking. The intensity value of a sample point corresponds to the brightness level of that point as detected by the imaging device 28. In one examplary embodiment of the invention, where the markings are decimal numerals punch-stamped or die-stamped into a metal workpiece, as shown in FIG. 3, each marking is about 80 mils wide and 100 mils high and has therefore an aspect ratio between width X and height Y of about 8/10ths. The array of sample points (where each point corresponds to a component of the derived electrical signal) is a 35 × 35 point rectangular array in which the distance between adjacent points in the X direction is about 8/10ths of the distance between adjacent points in the Y direction. If the X sampling interval is about 3 mils and the Y interval is about 3.75, this array of points overlaps the marking which is being inspected, and is about 1.3 times as high and as wide as a marking, so as to accommodate a corresponding misalignment between a marking and the inspection position. The electrical signal thus has a total of 35 × 35 components, each identifying the brightness of a corresponding point of this rectangular array. The sampling intervals in the X and Y directions should be chosen such that the marking fills as much as possible of an N × N array of sample points (so as to provide as much information as possible and to satisfy the requirements of the fast transformation technique discussed below). However, it may be desirable to leave a margin around the marking to accommodate some misalignment.

Referring to FIG. 3, the marking is the numeral 4 which has been punch-stamped or die-stamped into the top surface of the workpiece 10 so as to form a surface irregularity of the same material as the workpiece, and the 35 × 35 array of points overlaps the marking and is within the border designated by the reference numeral 38. Because of the angles of the light sources 34 and 26 with respect to the top surface of the workpiece 10, the depressed portion of that surface defining the numeral 4 have different reflectivity characteristics from the surrounding area. Accordingly, a point of the 35 × 35 array which coincides with this depressed area will have a signal component indicating either more or less brightness than a point which is on the top surface of the workpiece 10 outside the depressed portion thereof forming the numeral 4, depending on factors such as the particular angles, the surface properties of the workpiece 10, and the like.

The signal provided by the imaging device 28 is typically influenced by factors which are irrelevant to the important characteristics of the inspected marking, and may actually be confusing. Such factors include nonuniformity of the illumination of the aea 38 that includes the markings under inspection, local variations in the reflectivity of the inspected surface, such as variations caused by rust, specks of dirt or other foreign matter and the like, local variations in the response of the imaging device 28, other sources of noise, and the like. In order to reduce the effect of such irrelevant or confusing factors, the electrical signal provided by the imaging device 28 is locally smoothed at 29 (FIG. 2) by changing the value of some or all of its components in accordance with the value of the components for adjacent points of the 35 × 35 array. In one specific embodiment of the invention the value of every component with an even-numbered row and column in the 35 × 35 array is replaced with the average value of that point and the 8 array points surrounding it, to arrive thereby at an array of 17 × 17 smoothed signal components.

Figure 4:
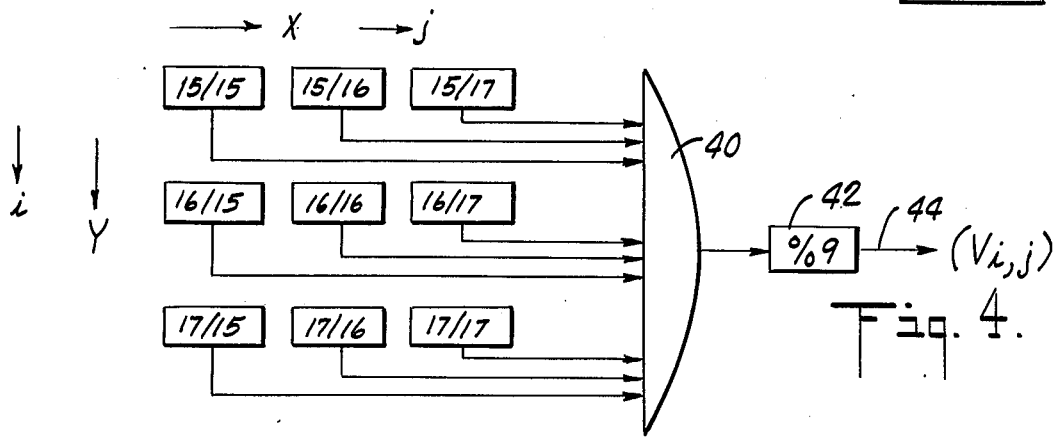
FIG. 4 illustrates a portion of a smoothing circuit forming a part of the invented system.

An illustrative portion of one exemplary circuit for deriving the smoothed signal component in accordance with the invention is illustrated in FIG. 4. The degree of brightness for each point of the 35 × 35 array is stored in a corresponding 8-bit register. FIG. 4 shows a portion of such array of registers, where the X direction is from left to right and the Y direction is from top to bottom, the first two digits of the reference numeral of a register identify the X position of the corresponding point in the 35 × 35 array, and the last two digits identify the Y position in the same array. For point 16/16 of the 35 × 35 array of points, the smoothed value is derived by adding the values of the indicated 9 registered in an adding network 40 (which is illustrated as a simple AND-gate but is in fact a binary adder) and dividing the resulting sum by 9 in a dividing network 42, to provide thereby on an output line 44 a smoothed signal component for the 17 × 17 array of points. Note that the division by 9 may be omitted if the equipment used has sufficient capacity to handle the number of significant figures without such division. The signal value of each even-numbered point of the 35 × 35 array is similarly replaced by the average of the value for that point and the values for the 8 points surrounding it by means of similar circuits. This smoothing of the signal from the imaging device 28 in affect exchanges a softening of the image of the marking (a loss of resolution from 35 × 35 points to 17 × 17 points) for a substantial improvement in signal-to-noise ratio. It should be noted that if the effect of various noise sources is sufficiently low, as for example in the case of a well-defined marking on a high contrast background, smoothing of the type described above may be omitted. Moreover, if the imaging device 28 is of the image dissector type (scanning an image with an aperture), the aperture may be made sufficiently large to provide an equivalent amount of overlap taking the place of the smoothing described above. With this technique, the imaging device 28 would directly provide a 17 × 17 array.

The brightness of each point of the resulting 17 × 17 smoothed array over signal components is at this time expressed by a multibit binary number. In the exemplary embodiment of the invention discussed here the brightness for each point is expressed by an 8-bit binary number, accommodating 256 shades of brightness. In order to compact the information content of this signal, and in order to further reduce the effect thereon of irrelevant and confusing factors of the type discussed above, the smoothed signal is quantized into a ternary level signal in accordance with the invention. When combined with smoothing (or its equivalent), this quantization not only increases substantially the information content density of the signal (as compared, for example, with binary quantization) but also substantially reduces the detrimental effect of irrelevant signal changes while enhancing the effect of signal changes which may not be too prominent but are in fact signifcant. More specifically, the ternary level quantization helps reduce the effect of lower frequency problems, such as change in illumination level or more gradual changes in surface reflectivity of the workpiece while the smoothing helps combat higher frequency problems, such as spatial and temporal noise spikes. It is the combined effect of smoothing and ternary quantization that is particularly beneficial. The ternary signal level quantization which has been found best suited to the typical environment of this invention responds to changes in signal level rather than to the signal itself. More specifically, the smoothed electrical signal is examined for transitions between levels rather than for levels, and one ternary level is assigned for a sharp change from low to high in the smoothed signal, another ternary level is assigned for a sharp change from high to low, and a third ternary level is assigned for the lack of either change. The parameter for what is considered a sharp change and for what is considered the lack of a change is selected, in accordance with the invention, to reflect the typical industrial environment in which the invented system is intended to operate.

The ternary level quantization examines the components forming the 17 × 17 array of smoothed signal components, establishes a threshold level in accordance with the invention, and then assigns for each examined point a zero, a +1, or a −1 in accordance with the following table:

TABLE 1

|  | $|YD| \leq \delta$ | $YD > \delta$ | $YD < -\delta$ |
|---|---|---|---|
| $|XD| \leq \delta$ | $\mu = 0$ | $\mu = +1$ | $\mu = -1$ |
| $XD > \delta$ | $\mu = +1$ | $\mu = +1$ | $\mu = +1$ |
| $XD < -\delta$ | $\mu = -1$ | $\mu = -1$ | $\mu = -1$ |

In the table above the subscripts $i$ and $j$ should follow each XD and YD, and $XD_{i,j}$ designates the difference between the signal components for the point at $i,j$ and the point at $i,j-1$ of the 17 × 17 array of points of the smoothed signal, $YD_{i,j}$ designates the difference between the signal components for the points $i,j$ and for the points $i-1,j$ of the same 17 × 17 array, the quantity $\delta$ is the selected threshold level, and the quantity $\mu$ is the value of the ternary level signal. More specifically, the quantities XD and YD are defined as follows, where the quantity V designates the value of the smoothed signal component at the corresponding point of the 17 × 17 array:

$$V_{i,j} - V_{i,j-1} = XD_{i,j}$$

$$V_{i,j} - V_{i-1,j} = YD_{i,j} \qquad \text{(e-1)}$$

Since the leftmost column and the topmost row of the 17 × 17 array of smoothed signal components do not give corresponding ternary values (because there are no respective points to the left and above) the ternary quantization gives a 16 × 16 array of ternary level signals $\mu_{i,j}$. Note that the assignment $\mu = -1$ for $XD < -\delta$ and $YD > \delta$ and $\mu = +1$ for $XD > \delta$ and $YD < -\delta$ is arbitrary, and that reversing these signs of $\mu$ would have been feasible. For the selected assignment, a diamond shaped dark marking on a light background will result in −1's on the lefthand edges of the resulting 16 × 16 array and +1's on the right hand edges. If the signs are reversed, the top edges of the diamond would be −1's and the bottom edges would be +1's.

Figure 5:
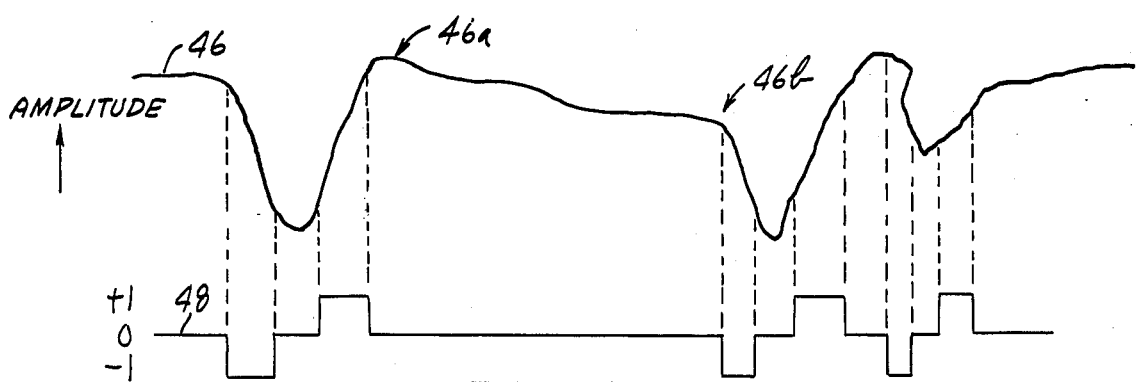
FIG. 5 is a graph illustrating a ternary quantization in accordance with the invention.

The principle of the ternary level quantization used in this invention is illustrated in FIG. 5, where the upper graph is labelled 46 and illustrates in analog form the smoothed electrical signal representing a marking and the bottom graph is labelled 48 and represents the ternary level quantized signal with levels zero, −1, and +1. It can be clearly seen that the ternary level quantization responds to certain defined changes in level of the signal illustrated at 46 rather than to the absolute level of the signal at 46. Thus, in the shown example the downward drift from 46a to 46b on graph 46 is not mistaken for a significant change in the smoothed electrical signal (because its slope is small) although the level of the signal from the 46a area to the 46b area changes significantly.

Figure 6:
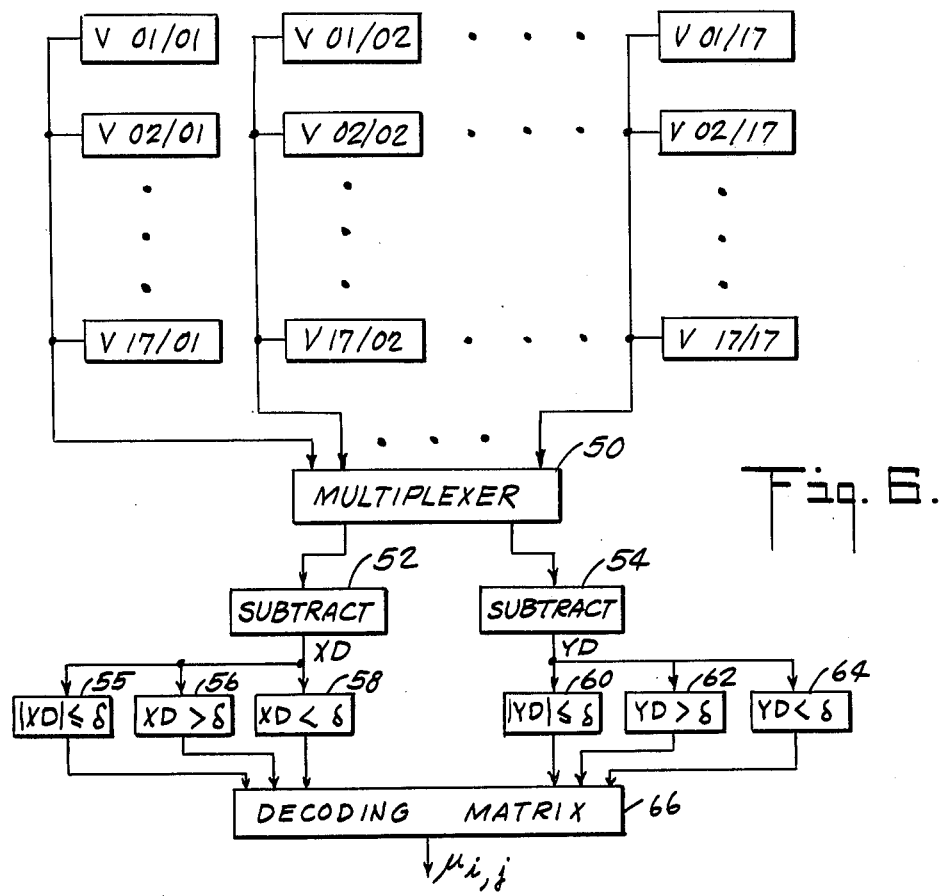
FIG. 6 is a block diagram illustrating a portion of a circuit for ternary conversion.

One exemplary circuit for carrying out the ternary level quantization shown generally at 31 in FIG. 2 is illustrated in FIG. 6, where each of the registers labelled V stores the smoothed signal component for one of the points of the 17 × 17 array of points, i.e., each of the registers labelled V stores a sample point of a signal of the type provided on the line 44 of FIG. 4. The registers V in FIG. 6 are labelled by two pairs of digits where the first pair identifies a point along the X direction of the 17 × 17 array and the second pair identifies a point along the Y direction of the 17 × 17 array. The contents of each of the registers are supplied to a multiplexer 50 which applies to each of the subtractors 52 and 54 the operands of the respective expressions (e-1) given above. The subtractor 52 therefore provides at its output the quantity $XD_{i,j}$ and the subtractor 54 provides the quantity $YD_{i,j}$ for the same point of the 16 × 16 array of points discussed above. The output of the subtractor 52 is applied to each of comparators 55, 56 and 58, while the output of the subtractor 54 is applied to each of comparators 60, 62 and 64. Each of the comparators compares the quantity supplied to it with the threshold value $\delta$ previously stored in it in accordance with the indicated inequality and supplies an indication of the comparison results to a decoding matrix 66 which operates in accordance with Table 1 discussed above to provide at its output the value for a component of the 16 × 16 array of points whose subscripts are the same as the subscripts of the quantities provided at that time by the subtractors 52 and 54.

In accordance with the invention the value of the quantity δ, which is the threshold for the ternary level quantization, is selected to optimize accuracy in the environment in which the invented system would typically operate. One technique for selecting this threshold value is to first select a low threshold value and to then slowly increase the threshold value while successive known markings are being inspected by the invented system until the 16 × 16 array of points for markings having the same meanings is the same with sufficient consistency. This generally means increasing the threshold value until large featureless areas of the workpiece or the marking are relatively free of +1's or −1's, but the transitions at the outlines of a marking are completely (or nearly so) free of zeroes. As one example, if the marking is a diamond, the surrounding background and the interior of the diamond should be primarily 0's, with at most only occasional +1's or −1's, while the outline should be only +1's or −1's.

The ternary level quantized signal derived as discussed above is then transformed by a selected transformation at 33 (FIG. 2) in order to further reduce the effect of irrelevant or confusing factors and to enhance the characteristics which are important for identifying the inspected marking. The transformation selected in accordance with the invention is inherently energy preserving in the sense that it does not change a property of the transformed signal which is considered to correspond to the energy content of the marking representation. With this in mind, an energy normalization is carried out either before or after the transformation, or partly before and partly after the transformation (at 35 and 37 in FIG. 2), in order to further reduce noise effects and irrelevant factor effects on the electrical signal representation of the inspected marking and to further enhance the significant aspects of the electrical signal. In a particular embodiment of the invention, energy normalization is carried partly before and partly after the transformation: an energy normalization factor $E_K$ is derived at 35 from the quantized signal prior to the transformation at 33 and then at least those components of the transformed signal which will be used later are energy normalized at 37 in accordance with the derived normalization factor $E_K$. The normalization factor $E_K$ can be expressed as follows, where the quantity $\mu_{i,j}$ is a component of the quantized signal and corresponds to a point of the 16 × 16 array of points discussed above:

$$E_K = [\sum_{k=1}^{16} \sum_{j=1}^{16} |\mu_{i,j}|]^{\frac{1}{2}} \quad (e-2)$$

Note that the normal expression for the energy normalization factor includes the square of the quantity $\mu_{i,j}$. However, since $\mu_{i,j}$ is 0 or ± 1 in the 16 × 16 array discussed above, $(\mu_{i,j})^2$ is replaced by its absolute value $|\mu_{i,j}|$ which simplifies the operation of this device.

If every component of the smoothed electrical signal corresponding to the 16 × 16 array of points is then divided by the quantity $E_K$ and the resulting quotients are squared, the energy of the normalized marking represented thereby would be unity, i.e., the locus of the end points of all normalized vectors would be the unit sphere in a 256-dimensional space.

Figure 7:
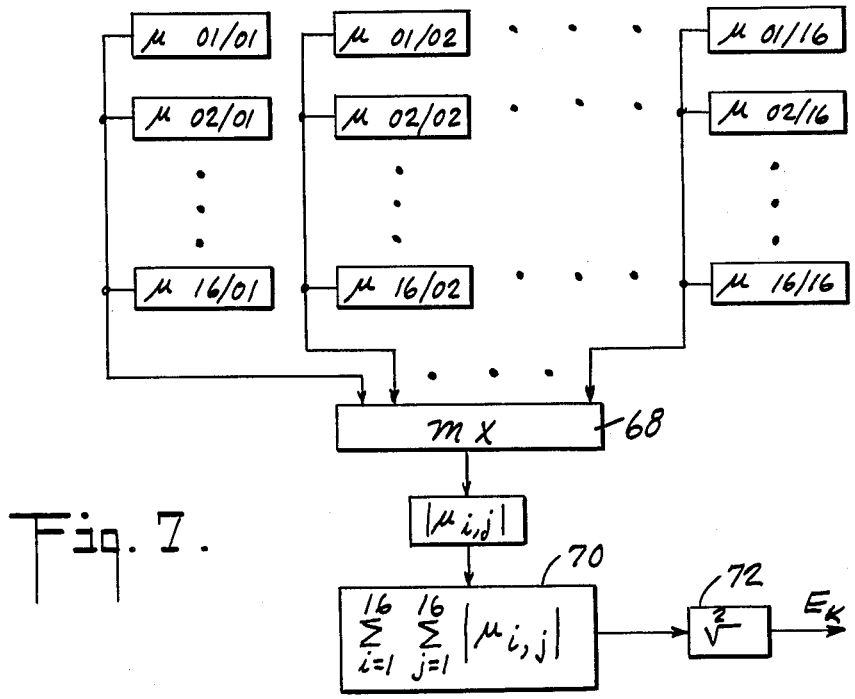
FIG. 7 is a block diagram of a portion of a circuit for deriving an energy normalization factor and for deriving selected transform components of a marking.

An exemplary circuit for deriving the normalization factor $E_K$ is shown in FIG. 7 and includes a 16 × 16 array of registers μ each containing a component of the smoothed electrical signal. The registers are labelled similarly to the registers shown in FIG. 6 and discussed in connection therewith. The contents of each of the registers of FIG. 7 is supplied to a multiplexer 68 which in turn applies to a summing network 70 the sequence of components necessary for carrying out the indicated summing operation. The output of the summing network 70, after all of the components of the 16 × 16 array of points have been supplied to it in the necessary sequence, is the square of the normalization factor; and this output is supplied to a square root network 72 whose output is the sought normalization factor $E_K$.

After the energy normalization factor is derived as discussed above, a selected Walsh/Hadamard transformation is performed on the smoothed signal components stored in the 16 × 16 array shown in FIG. 7. It should be noted that the Walsh/Hadamard transformation chosen in accordance with the invention is particularly well matched with the smoothing and the ternary quantization described above because the transform operation involves the multiplication of the 16 × 16 array by matrices whose elements are positive and negative unities, which results in greater separation in Eucledian space between different markings as compared with a transformation of, for example, binary quantized signals. The Walsh/Hadamard transformation chosen in accordance with the invention involves up to 2048 addition/subtraction operations, (i.e., up to $2N^2 \log_2 N$ where N is the dimension of the array which is being transformed, e.g., N=16 for the case discussed here). The transformation used in this invention is two-dimensional. Due to the chosen transformation, the bulk of the information content of the relatively highly correlated 16 × 16 array of points is compacted into relatively uncorrelated transformed signal components, thus ensuring a greater discrimination as between markings that have different meaning for a given number of components. This is so because typically only a small number of the W/H transform components have high values and therefore high information content, while most of the components have low values and therefore low information content. Moreover, since each component of the transformed signal contains a contribution from every component of the 16 × 16 array, and thus of the entire inspected marking, the effect of noise components is greatly minimized.

In one specific embodiment of the invented system, the Walsh/Hadamard transformation of the components of the smoothed signal, i.e., the components of the 16 × 16 array discussed above, which are stored in the 16 × 16 array of registers illustrated in FIG. 7, are supplied to a transform computer 74 which are of the types discussed in detail in: Alexandridis, N. A. et. al., *Real-Time Walsh/Hadamard Transformation, IEEE Trans. on Computers*, March 1972, pp 288–292; or in Carl, J. W. et al., *A Hybrid Walsh Transform Computer, IEEE Trans. on Computers*, Vol. C-22, No. 7, July 1973, pp 669–672, or in other prior art. The decoding matrix 66 of FIG. 6 includes the necessary circuitry for supplying the contents of the 16 × 16 array of registers to the transform computer 74 in the necessary sequence. Since the transform computer itself is known in the prior art, although as used for other purposes, there should be no need to describe it in detail in this specification.

Some of the resulting components of the transformed signal are more important and more helpful than others in identifying the marking from which they have been derived. In fact, some of the components may be not only less important and less helpful, but actually confusing because they reflect features of the originating marking that may vary as between markings having the same meaning. In order to further enhance important characteristics of the signal representing the inspected marking and to reduce the effect thereof of irrelevant or confusing factors, the invented system: (1) selects those components of the transformed signal that are likely to reflect factors that should distinguish between markings having different meanings, and (2) eliminates or fails to consider those components of the transformed signal that are unlikely to reflect factors distinguishing between markings having different meanings or factors that are likely to distinguish between markings having the same meaning. More specifically, the invented system selects at 39 (FIG. 2) for further use primarily those components of the transformed signal that correspond to lower resolution characteristics of the originating markings and eliminates or fails to consider most but not necessarily all of the transformed signal components corresponding to higher resolution characteristics of the originating marking. In the terminology typically associated with Walsh/Hadamard transform, the low sequency components correspond to low resolution and the high sequency components correspond to high resolution. The low sequency components are typically associated with the essence of a marking since these components can be thought of as representing a blurred image of the marking, which tends to mask the small differences between markings having the same meaning, i.e., between one numeral 8 and another. It should be noted, however, that there are differences in fine detail which are essential for distinguishing between certain markings that have different meaning, e.g., for distinguishing between the numerals 3 and 8 or the letters O and Q. For this reason, certain selected high sequency components are also used in the invented system.

Note that the energy normalization factor $E_K$ is derived at 35 (FIG. 2) from the 16 × 16 array and before the Walsh/Hadamard transformation, while the active energy normalization (i.e., division by $E_K$) is at 37 and occurs after the Walsh/Hadamard transformation and the selection of only some of the transform components. This arrangement allows $E_K$ to be derived simply from the array of $\mu = \{0, +1, -1\}$, whereby only summing and sign-changing operations are involved, in accordance with expression (e-2), rather than the squaring operations which would have been involved if $E_K$ were to be computed instead from the Walsh/Hadamard components, which typically would be expressed in numbers different from 0 and ± 1. Moreover, if $E_K$ were to be derived from the Walsh/Hadamard transform components, all transform components would have had to be computed and then the unneeded ones discarded. Because of the arrangements described above, only the actually needed transform components are computed, thus saving computational circuitry or time. By doing the second part of energy normalization at 37, after the feature selection at 39, only the actually needed transform components are energy normalized, thus saving additional circuitry or time.

Figure 8:
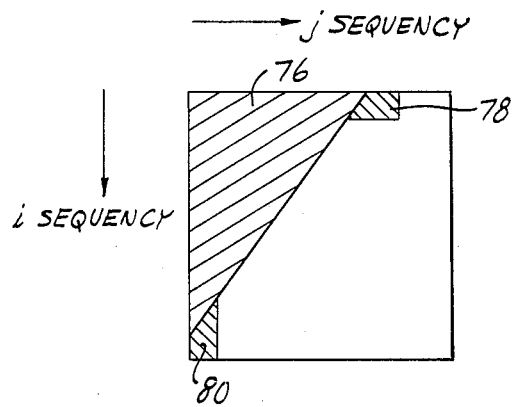
FIG. 8 is a graph illustrating a typical selection of transform components for further use in accordance with the invention.

Referring to FIG. 8 for an illustration of the selection of Walsh/Hadamard transform components, the array of transformed signal components derived at 33 (FIG. 2) as described from the 16 × 16 array of quantized signal components from 31 (FIG. 2) as illustrated as a square in which the sequency in the $i$ and $j$ directions increases along the indicated arrows. Since in the example of the invention discussed here the markings have an aspect ratio of 8/10ths, i.e., the characters are taller than they are wider, and therefore the distance between points in the X direction in the 35 × 35 array of points was less than that in the Y direction, the transformed signal components of interest in this invention can be thought of as located in the shaded area 76, which extends further in the $i$ direction than in the $j$ direction in terms of sequency. If still further discrimination is desired between markings which are relatively similar to each other (e.g., the numerals 3 and 8 or the letters O and Q), the sequency of the components of interest may be increased, e.g., to include the shaded areas 78 and 80. In the graphical illustration of FIG. 8, the lowest sequency components (the lowest resolution components) are at the upper left corner of the square and the highest sequency (highest resolution components) are at the bottom righthand corner of the square. Note that it is typically desired to use the topmost row and leftmost column of transform components (or most of the topmost row and leftmost column) because the topmost row is insensitive to vertical (Y) registration errors of the marking and the leftmost column is insensitive to horizontal (X) registration errors of the marking 10 with respect to the inspection position 22.

Figure 9:
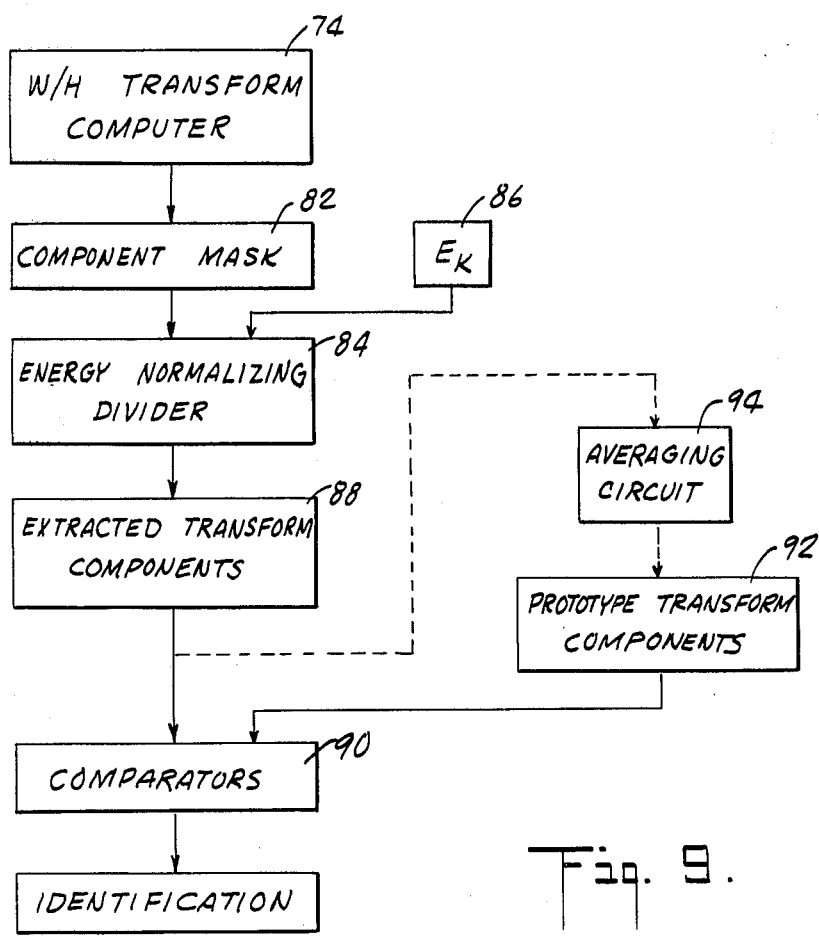
FIG. 9 is a block diagram illustrating the forming of prototypes and identifying workpiece markings.

In one exemplary implementation of the invention, as illustrated in FIG. 9, the transformed signal components $L_{i,j}$ provided by the transform computer 74 are applied to a component mask 82. The component mask 82 may be a gate matrix, where the gates associated with components to be retained for subsequent use are open, and the gates associated with components that will not be used subsequently are closed. The gate matrix is a simple form of a weighting network in which the weight factor is either 0 or 1. Alternately, a weighting network may be used in which the weighting factor for each component is chosen individually in the range of from 0 to 1, and each component is weighted in accordance with its importance. Still alternately, the component mask 82 may be a part of the transform computer 74, e.g., the transform computer 74 simply does not have the circuitry necessary to derive the components of the sequencies that are not going to be used subsequently.

Thus, the Walsh/Hadamard transformation at 33 may be done by a system which derives only selective ones of the transform components and does not derive or deliver the undesired components. For example, one preferred system used in this invention derives only 36 out of the possible 256 transform components. The derived 36 components are the complete first column of the transform component array, the first 8 terms of the second column, and the first 8 terms of the second column, and the first 8 terms of each of the first and second row. In either case, the output of the component mask 82 is a series of selected sequency components of the transformed signal. These selected components of the transformed signal are applied to a dividing circuit 84, which divides each component by the value of the energy normalization factor $E_K$ which is provided from the circuit shown in FIG. 7 and is stored in the storage device 86 in FIG. 9. The resulting portions form the extracted signal discussed above and are stored in a storage device 88. The quotients forming the extracted signal derived from a single inspected marking are compared in a comparator 90 with prototype signals from a storage 92. As a result the comparator 90 provides at its output an indication of which prototype signal corresponds most closely to the extracted signal provided from the storage 88.

Note that while the complete Walsh/Hadamard transform array be defined as a conformal transformation, a selection of less than all components makes the transformation operation in this invention a nonconformal one.

The prototype signals stored in the storage device 92 in FIG. 9 (41 in FIG. 2) are derived from sample markings in a process similar to that described above. More specifically, known markings are inspected by the system as described above, the resulting extracted signal derived from each is applied to an averaging circuit 94, and the output of the averaging circuit 94 is stored in the storage device 92. As one example, workpieces each having markings of the type shown in FIG. 3 are registered in sequence with the inspection position 22, and the resulting extracted signals are applied from the storage device 88 to the averaging circuit 94. The averaging circuit 94 includes a circuit for averaging each extracted signal component, and applies to the prototype storage 92 an averaged version of each extracted signal component. The prototype storage 92 includes a storage location (e.g., a storage register) for each of the extracted signal components of each of the several different markings that may be encountered by the system. For example, if the invented system is to be put to work in identifying workpieces which have serial numbers consisting of decimal numerals punch-stamped on a surface thereof, and 36 Walsh/Hadamard transform components are used, there are 10 groups of storage locations, each group for a different decimal digit and each group consisting of 36 storage locations for the 36 Walsh/Hadamard transform components. When a marking is being examined at the inspection position 22 the identity of the marking is indicated to the storage 41 (FIG. 2) by a manual keyboard 43 to cause the resulting extracted signals to be stored in the group of storage locations corresponding to the examined marking. When a sufficient number of sample markings have been used as described above to derive the prototype signals, inspection of unknown markings of the same type can begin, by beginning to apply the output of the extracted signal storage 88 to the comparator 90 rather than to the averaging circuit 94. The comparator 90 compares each component of the extracted signal with the corresponding component for each of the different prototype signals stored in the device 92. In the example of serial numbers discussed immediately above, each component of the extracted signal derived from a marking which is a decimal numeral is compared with the corresponding component for each of the ten decimal numerals stored in the device 92. Note that the comparator 90 determines which of the prototype signals is closest to the extracted signal rather than determining if there is absolute identity between the extracted signal and a prototype signal.

An important feature of the invention is that it can be trained to inspect and identify markings by relatively unskilled operators because the training procedure simply involves exposing known prototype markings to the system. No specific sequence of marking types is required, since the identify of each marking is indicated to the system by an operator as the marking is being inspected by the system. It should also be noted that the system can be retrained to inspect and identify different markings by erasing the contents of the storage device 92 and proceeding to again train the system, in the same manner, but with different prototype markings, e.g., with numerals of a different font, with letters, or with completely different symbols.

As an alternative to the strictly hardware embodiment of the invention described above, the invention may be implemented as a special purpose machine relying partly on a specially programmed digital computer such as a Data General Nova II of a standard configuration including 32000 words of memory, each word containing 16 bits, a teletype terminal, a display such as a Textronics 403 oscilloscope, an EMR/Schlumberger 650 ODD serving as the imaging device 28 and suitable power supplies, lights and transport of the type described above. As in the strictly hardware embodiment, the alternative embodiment of the invention locates and centers a marking with respect to an electrooptical scanner, scans the marking to derive a digitized representation of the marking, smoothes the output of the imaging device and quantizes it in a special type of ternary quantization, derives an energy normalization factor from the ternary quantized signal, performs a special-type reduced Walsh/Hadamard transform on the ternarily quantized signal, normalizes the transform components and either stores the normalized components in the prototype storage or compares the normalized components with prototype components to identify the marking. This is repeated for each marking which is inspected.

In accordance with the alternate embodiment of the invention, each marking indexed with the inspection position 22 (FIG. 2), is examined prior to scanning to determine if the contrast between the marking and its background is sufficient to provide a meaningful image, and to find a threshold value delineating between the marking and the background. By doing this, the occasional marking which may be insufficiently distinct from its background can be rejected so as not to cause errors, and an individual signal threshold can be set for each individual marking so as to take into account variations in background and in marking reflectivity as between successive markings. Moreover, before a scan starts, the image of a marking is electronically centered with respect to the imaging device 28 such that the 35 × 35 array of sample points properly overlaps the marking. Only then does the actual scan of a marking start to derive the signal representing the digitized image intensity at each point of the 35 × 35 array of sample points.

Figure 10:
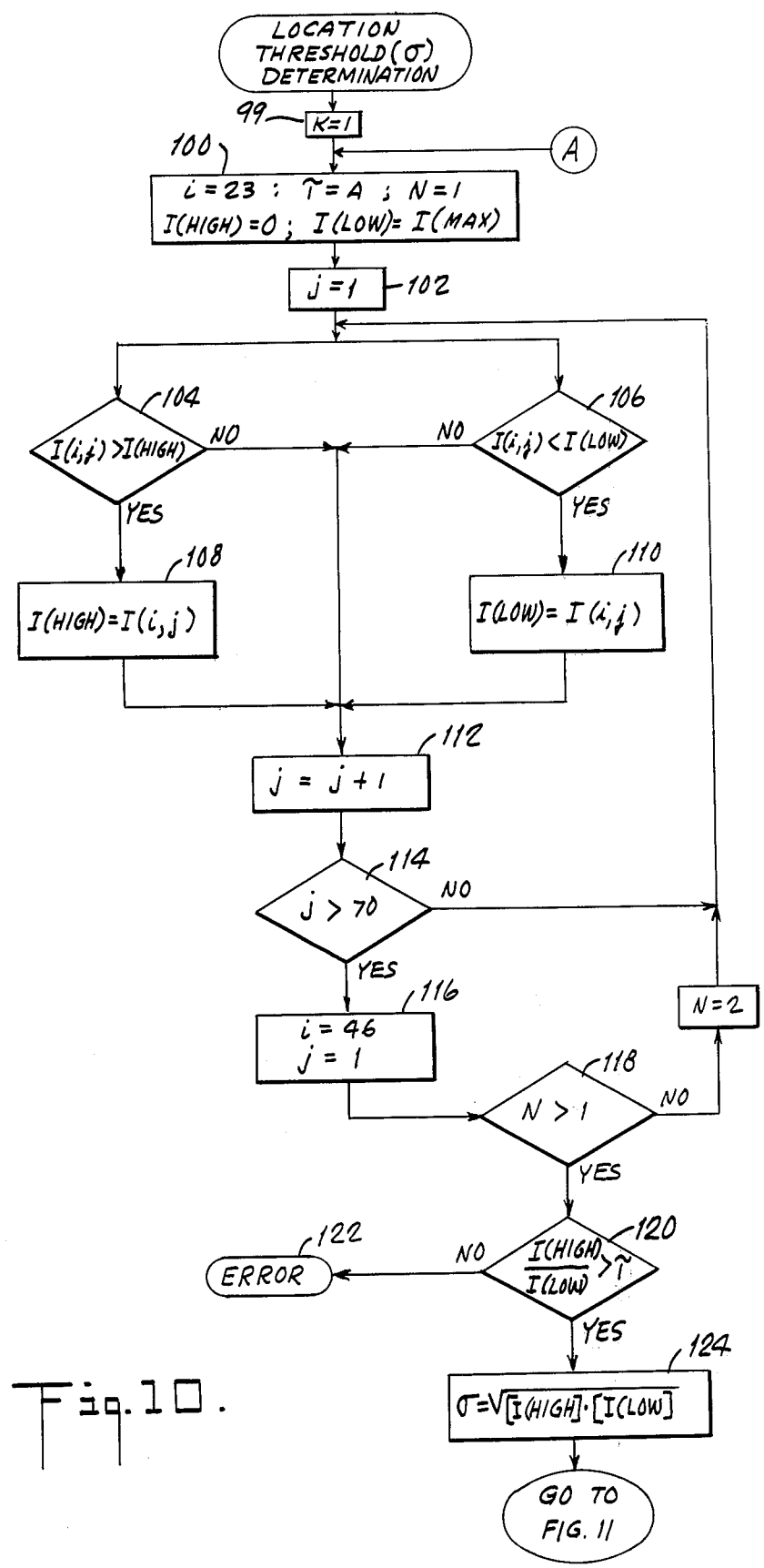
FIG. 10 is a flow chart illustrating the determination of a threshold value for optoelectric location of a marking.

The procedure for finding the intensity threshold "sigma" for the location of the marking at the inspection position 22 is illustrated in FIG. 10, and involves scanning two rows of the viewing field of the imaging device 28 which are likely to intersect a marking, keeping track of the lowest intentisyt scan point (or points) and the highest intensity scan point (or points), determining if the ratio of intensities between the highest and lowest points is sufficient for a marking to be distinguished from its background, and if so, finding the threshold for the particular marking as a function of the found highest and lowest intensities. Referring to FIG. 10, the procedure starts at 99 with the first marking of a row of ND markings, $K=1, \ldots, ND$, on the same workpiece. Referring to block 100, at FIG. 10, certain parameters are set; more specifically: if a marking is expected to nearly fill at 35 × 35 array of sample points, the viewing field may be 70 × 70 sample points arranged in 70 rows and 70 columns. Then the row i, which will be scanned first is set at about ⅓ the height of the viewing field, referring all points to the starting X and Y addresses of the 70 × 70 point scan yields $i=23$. Other parameters that are set are: the minimum acceptable ratio between the highest and lowest intensity points ($\tau = A$), the initial values of the highest and lowest intensity values, and the horizontal scan number N. Then the index $j$ is set to 1 at 102, and the scan along the 23rd row starts. The scan is through the 70 × 70 field which is expected to include an image of the marking. As the intensity of each sample point is read, it is compared at 104 with the current value of the highest intensity point and at 106 with the current value of the lowest intensity point. If the intensity of the current point is determined at 104 to be greater than that of the current highest intensity, it is stored at 108 as the current highest intensity value. Similarly, if the intensity of the current point is determined at 106 to be lower than the current lowest intensity value, it is stored at 110 as the current lowest intensity value. After each test, the index $j$ is incremented at 112, a check is made at 114 to see if the $j$ value is still within the viewing field, and if it is, a return is made to the tests at 104 and 106. When all of the 70 sample points along the i-th row have been examined in this manner, the test at 114 transfers control at 116, where the index $i$ is set at 46, i.e., about ⅔ the height of the viewing field. The index $j$ is set to 1 to start at the 1st point of the 46th row, and the scan proceeds as described above. When the entire 46th row has been scanned in this manner, as determined by tests at 114 and 118, the ratio of the highest intensity and the lowest intensity that have been found is compared at 120 with the selected minimum value which was set at 100. If the ratio is not higher, this indicates that the marking is not sufficiently distinct from its background to be properly processed, and an error indication is provided at 122. If the ratio at 120 is higher than the reset value, the threshold value "sigma" is found at 124 as the geometric mean of the highest and lowest intensity values in accordance with the indicated expression, and the system proceeds to the procedure illustrated in FIG. 11. The geometric mean is used because it is believed to be more appropriate than the arithmetic mean in the presence of photon noise. However, in certain situations the arithmetic mean may be preferred. Additionally, in an alternative embodiment, the highest intensity value may be replaced by the average of the highest R values and the lowest intensity value may be replaced by the average of the lowest R values, where R is a small integer, say 2 or 3. Note that only the first marking of a workpiece is scanned within a 70 × 70 points viewing field. Any subsequent marking is scanned within a smaller field, say 45 × 45 points, which is located after having found the exact position of the previous marking in the procedure of FIG. 11.

After the threshold value has been found as described in connection with FIG. 10, the system proceeds to locate the left, right, top and bottom edges of the marking, so as to properly position the 35 × 35 array of sample points with respect to the marking and to then scan the marking within the 35 × 35 array. This procedure involves, for the first marking on a workpiece, starting at the upper left corner of the 70 × 70 viewing field and proceeding column by column, from top to bottom within a column, and left to right as between successive columns, until a point is encountered whose intensity is greater than the threshold intensity value "sigma". The assumption here is that the marking is brighter than the background; the reverse is used for the opposite case. When a sufficiently bright point is found along a given column, a test is made to see if several consecutive points immediately below it are also above the threshold, so as to discriminate between an accidentally bright point and a bright point which is a part of a marking. If the test is satisfied in the first column, the pattern is rejected as possibly being out of the scanning field. If the test is satisfied in a column after the first and is also satisfied in several consecutive columns following that column, the left edge of the marking is considered to be the column that first satisfied the test. The number of required consecutive bright points within a column and the number of consecutive columns satisfying the test are set as a function of the line width of the image of the marking; e.g., 2 or 3. The right edge of the marking is found by continuing the column scan past the right edge until several consecutive columns are found that satisfy a test for fewer than the prescribed number of consecutive bright points. The right edge is considered to be one less than the first column that satisfied this test. A width test is carried out by comparing the difference between left and right edges with maximum and minimum limits. If the marking is found to be too narrow, the threshold is lowered by ⅛ of its value and the left and right edge searches are repeated. If the marking is found to be too wide, the threshold is raised by ⅛ of its value and the searches are repeated. The top and bottom of the marking are determined by starting in the vertical center of the field; e.g., row 35 in a field that is 70 rows high, and scanning up and down row by row, to find the top and bottom edges respectively of the marking. These edges are found by continuing the row scan until several consecutive rows are found that satisfy a test for fewer than the prescribed number of consecutive bright points. The top and bottom edges are considered to be the row before the first such rows satisfying the test. A height test is carried out using the top and bottom edges in the same manner as the left and right edges were used in the width test. Once the left, right, top, and bottom edges of the marking have been found, the center of the marking C(a,b) is found where $a$ is the midpoint between the top edge and bottom edge row numbers and $b$ is the midpoint between the left edge and right edge column numbers. Then the starting X and Y addresses of the 35 × 35 point array that overlaps the marking are (b-17) and (a-17), respectively.

Figure 11A:
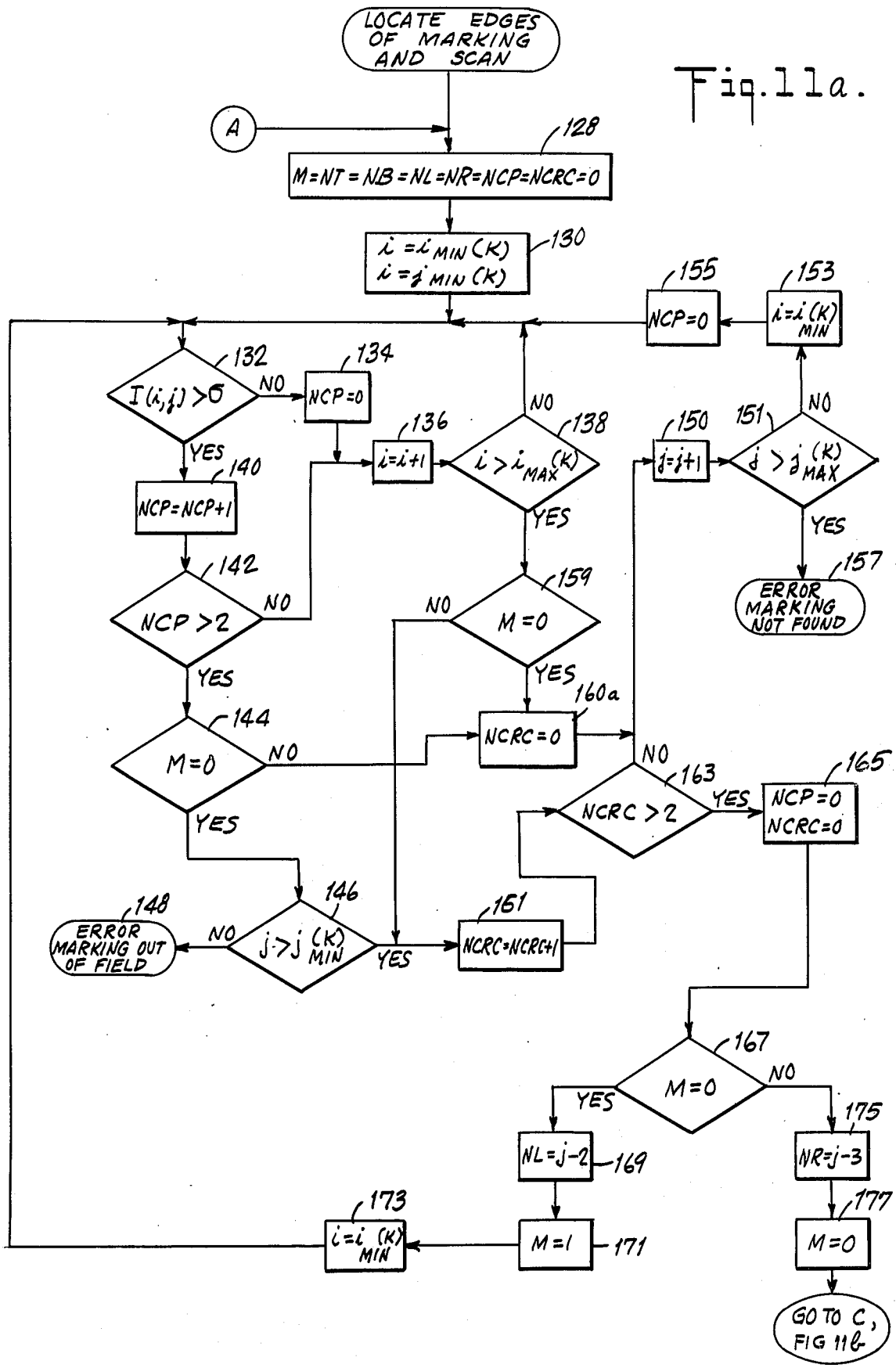
FIGS. 11a, 11b and 11c are a flow chart illustrating the locating of a marking and scanning the marking.
Figure 11B:
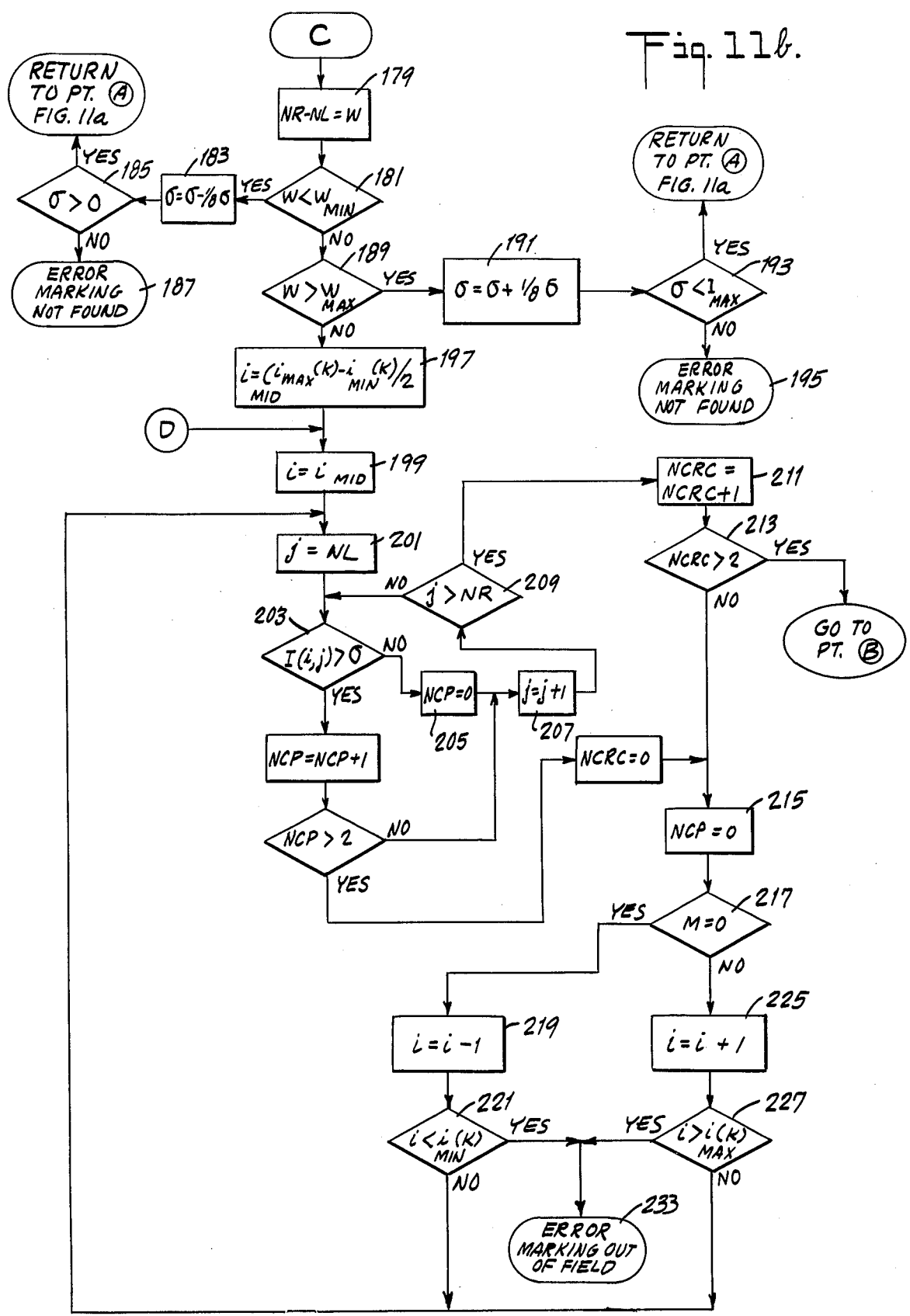
Figure 11C:
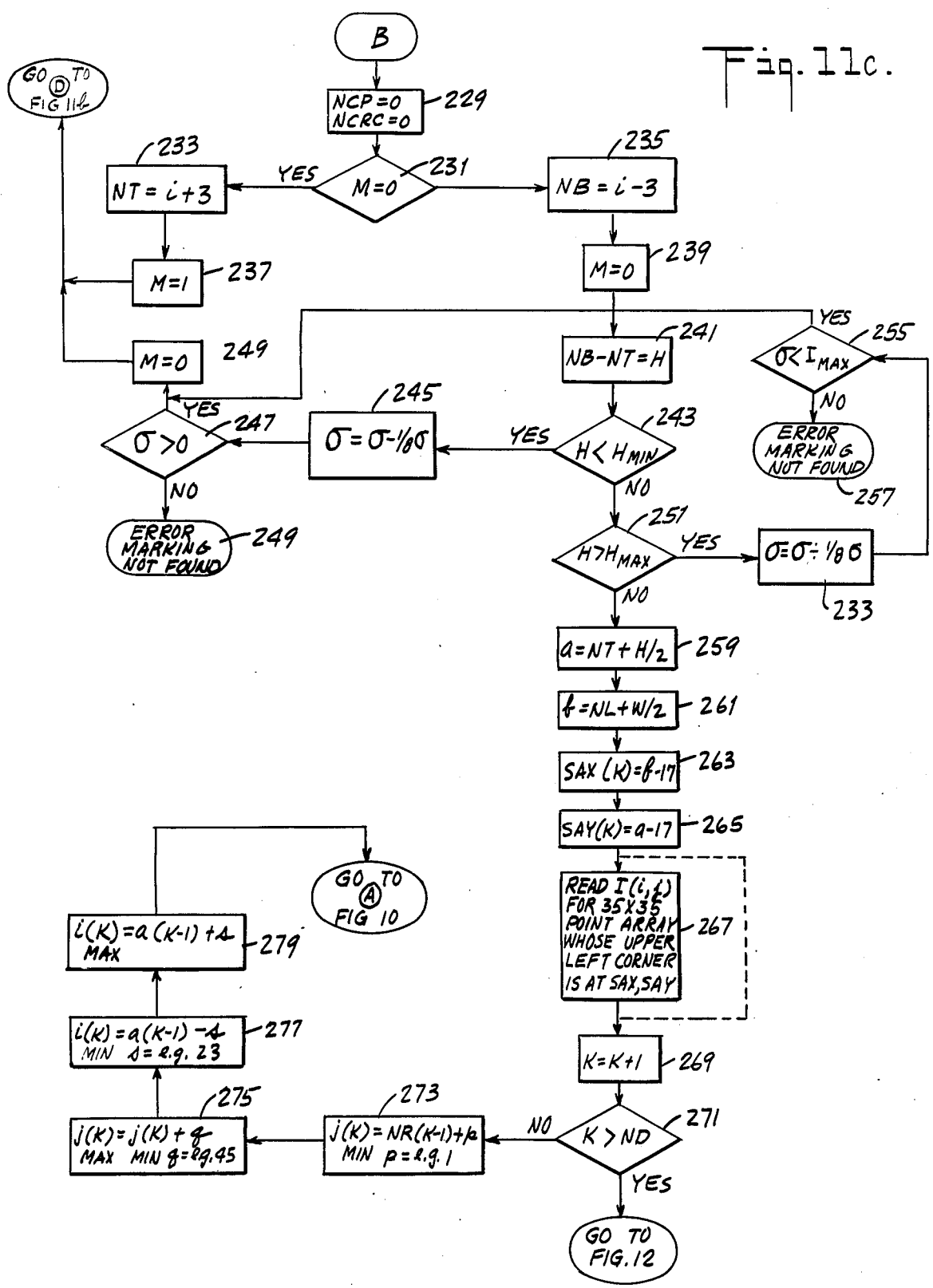

The procedure for finding the location of a marking in the viewing field of the imaging device 28 is illustrated in FIGS. 11a, 11b and 11c. The new symbols used in 11a–11c are as follows: The number of rows of sample points in the scan of the K-th marking of a row of markings on the same workpiece (K = 1, 2, ..., ND) is $i_{max}^{(K)}$, and the number of columns in the same scan is $j_{max}^{(K)}$. Assume that $i_{max}^{(1)} = 70$. For any given marking the row numbers of its top and bottom edges are NT and NB respectively, and the column numbers of the left and right edges are NL and NR respectively. There is a quantity M which is set M = 0 when searching for NL and NT, and M = 1 when searching for NR and NB. There is a quantity NCP designating the number of consecutive sample points in a column which satisfy the threshold test; assume NCP = 3. There is a quantity NCRC designating the number of consecutive rows or columns which satisfy the NCP test; assume that NCRC = 3 to satisfy the NCRC test. For any individual marking K, the indices $i$ and $j$ are referred to the starting sample point $i_{min}(K)$, $j_{min}(K)$ of the the marking location scan for the marking K; assume that $i_{min}(1) = j_{min}(1) = 1$.

Referring to FIG. 11a, the procedure for locating the edges of a marking and scanning the marking to derive an electrical signal representing the marking starts by setting certain parameters. The quantities M, NT, NB, NL, NR, NCP and NCRC are each set to zero at 128, and the indices $i$ and $j$ are set as indicated at 130. The procedure now starts to examine each sample point of the array and to compare the brightness of that point with the threshold "sigma". The threshold comparison test is at 132, and if the tested sample point does not meet the threshold test the quantity NCP is (again) set to zero at 134, the index $i$ is incremented at 136 to refer to the next point down in the same column, a test is made at 138 to see if the entire column has been processed in this manner, and if not a return is made to 132. If the test at 132 shows that the tested point meets the threshold test, the quantity NCP is incremented at 140 and a test is made at 142 to see if at least three sufficiently bright contiguous points have been found in the same column. If the answer is no a return is made to 136 to continue looking at the same column. If the answer at 142 is yes a test is made at 144 to see that type of edge the system is trying to locate, and if the answer at 144 is yes a test is made at 146 to see if the column which is being examined is the first (leftmost) column. If it is, the marking may be out of the viewing field, and an error is indicated at 148. If the answer at 144 is no the quantity NCRC is (again) set to zero at 148, the index $j$ is incremented at 150 and a test is made at 151 to see if the current column is outside the field for the current marking. If it is not, the index $i$ is set at 153 to the top row of the marking field, the quantity NCP is set to zero at 155 and a return is made to 132 to start testing a new column. If the test at 151 has a positive answer, an error is indicated at 157 because the marking has not been found within the scan field. Note that if the test at 138 is positive, the quantity M is tested at 159, proceeding to 160a in case of a positive answer, and in case of a negative answer proceeding to 161, also reached in case of a positive answer at the test at 146. At 161, the quantity NCRC is incremented and a test is made at 163 to see if the same quantity is greater than 2. If no, the return is to 150 to increment the index $j$ to refer to the next column to the right, and if yes the quantity NCP and NCRC are set to zero at 165, and a test is made at 167 to see if the quantity M is zero. If it is this means that the left edge of the marking has been found, and the quantity NL is set as indicated at 169, the quantity M is set to 1 at 171, the index $i$ is reset as indicated at 173 to start looking for the right edge, and a return is made to 132. If the answer at 167 is negative, this means that the right edge has been found and the quantity NR is set as indicated at 175, the quantity M is set to zero at 177 and control is transferred to C is FIG. 11b.

Referring to FIG. 11b, the procedure is entered at C, the width W of the marking is found as indicated at 179, and a test is made at 181 to see if the width found at 179 is less than a certain minimum width which has been previously established and appropriately stored. If the width found at 179 is less than the minimum acceptable width, the threshold "sigma" is reduced by an eighth at 183 so as to be able to locate markings which are less distinct from their background, and a test is made at 185 to see if the newly set threshold is still greater than zero. If it is not, this means the marking, if any, is not distinguishable from its background and an error is indicated at 187 to the effect that the marking has not been found. If the test at 185 is positive a return is made to A at the top of FIG. 11a to start looking for the marking with the newly set value of the threshold. If the minimum width test is satisfied at 181 in FIG. 11b, a test is made at 189 to see if the marking is greater than a certain previously set and appropriately stored maximum width value. If the width found at 179 is greater than the preset maximum acceptable width, the threshold is increased by an eighth at 191 and a test is made at 193 to see if the newly set threshold value is still within a previously preset and appropriately stored maximum intensity value which is acceptable. If the answer at 193 is no, this means that the marking can not be distinguished from its background and an error is indicated at 195. If the answer at 193 is yes, a return is made to $a$ in FIG. 11a to start looking for the marking again with the newly set threshold value. If the width value found at 179 satisfies the test at 181 as well as the test at 189, the row number of the middle of the marking is found at 197 in accordance with the indicated expression, and the index $i$ is set at 199 to the value found at 197 and the index $j$ is set to the left edge NL at 201 so as to prepare the system to start looking for the top and bottom edges of the marking. In looking for the top and bottom edges, each sample point is again tested against the current threshold value at 203 and if the threshold test is not satisfied the quantity NCP is (again) set to zero at 205, the index $j$ is incremented at 207 to start looking at the next column on the right and a test is made at 209 to see if the current column is beyond the right edge of the marking. If it is not, a return is made to 203, if it is, the quantity NCRC is incremented at 211, a test is made at 213 to see if the quantity NCRC is greater than 2 and if yes control is transferred to B in FIG. 11c. If the answer at 213 is no, the quantity NCP is set to zero at 215 and a test is made at 217 to see if what is searched for is the top or the bottom of the marking. If it is the top, the index $i$ is detrimented at 219 to look at the next row up, and a test is made at 221 to see if the current row is still below the top row of the search field. If it is not, a return is made to 201 and if it is, this means that the top edge of the marking has not been found and an error is indicated at 223. If the test at 217 shows that the bottom edge of the marking is searched for, the index $i$ is incremented at 225 to look at the next row down and a test is made at 227 to see if the current row is below the bottom row of the viewing field for the current marking. If it is, an error is indicated at 223 and if it is not a return is made to 201 to start looking at a new row.

Referring to FIG. 11c, the procedure is reached in case of a positive answer at 213 in FIG. 11b and starts with setting each of the quantities NCP and NCRC to zero at 229. A test is made at 231 to see if the located edge is the top or bottom edge of the marking. If it is the top edge, the quantity NT is set as indicated at 233, and if it is the bottom edge the quantity NB is set as indicated at 235. After 233, the quantity M is set to 1 at 237 and a return is made to D in FIG. 11b to start looking for the bottom edge. When the bottom edge is set as indicated at 235, the quantity M is set to zero at 239 and the height H of the marking is found as indicated at 241.

The height found at 241 is tested at 243 to see if it less than a minimum height which has been previously preset and appropriately stored, and if it is the threshold is decreased by ⅛th at 245 so as to be able to detect markings which are not very distinct from their background. A test is made at 247 to see if the threshold is still greater than zero; if it is not, an error is indicated at 249 to the effect that the marking has not been found, and if it is the quantity M is set to zero at 249 and a return is made to D in FIG 11b to start looking for the top and bottom edges of the marking again with the newly set value of the threshold. If the minimum height test is satisfied at 243, a test is made at 251 to see if the height found at 241 is greater than a maximum height which has been previously preset and appropriately stored. If the height found at 241 is greater than the preset maximum height, the threshold value is increased by ⅛th at 253, and a test is made at 255 to see if the newly set threshold value is still less than a previously preset and appropriately stored maximum allowable intensity value, and if it is a return is made to 249. If the test at 255 is negative, an error is indicated at 257. If the answer at 251 is negative, indicating that the marking has satisfied all of the width and height tests, this means that the edges of the marking have been properly located and the marking can now be scanned within a 35 × 35 array of sample points. To find the row and column coordinates of the geometric center of the marking, the quantities $a$ and $b$ are found as indicated at 259, and then the upper left corner of the 35 × 35 array is found as indicated at 263 and 265. The marking is now scanned within the 35 × 35 array at 267 to derive, for each point of the array, a signal for the brightness of the point. Note that 267 may take place immediately after the edges of a marking have been located, or it may take place after the edges of all of the markings in a row of markings of the same workpiece have been located and appropriately stored. After 267, the quantity K is incremented at 269 to point to the next marking in a row of markings on the same workpiece, and a test is made at 271 to see if the current marking is still within the row of markings on the same workpiece. If it is not, control is transferred to the procedure of FIG. 12, but if it is preparations are made for processing the next marking of the same row. Specifically, at 273 the leftmost column of the search field for the new marking is set as indicated and at 275 the topmost row of the search field is set as indicated. At 277, the top row of the search field is set as indicated and at 279 the bottom row of the search field is set as indicated. A return is now made to A in FIG. 10 to determine the location threshold for the new marking. The procedure of FIG. 10 was previously described in connection with the first marking of a row of markings. For any subsequent marking within the same row, the procedure of FIG. 10 is modified as follows: the initial value of the index $i$ is set at 100 to a value which is ⅓ down from the value found at 277 toward the value found at 279 in FIG. 11c; the tests at 104 and 106 start at the values found at 273 and 277 of FIG. 11c; the test at 114 is against the value found at 275 in FIG. 11c; and the index $i$ is set at 116 to a value which is ⅔rds down between the values found at 277 and 279 in FIG. 11c.

Figure 12:
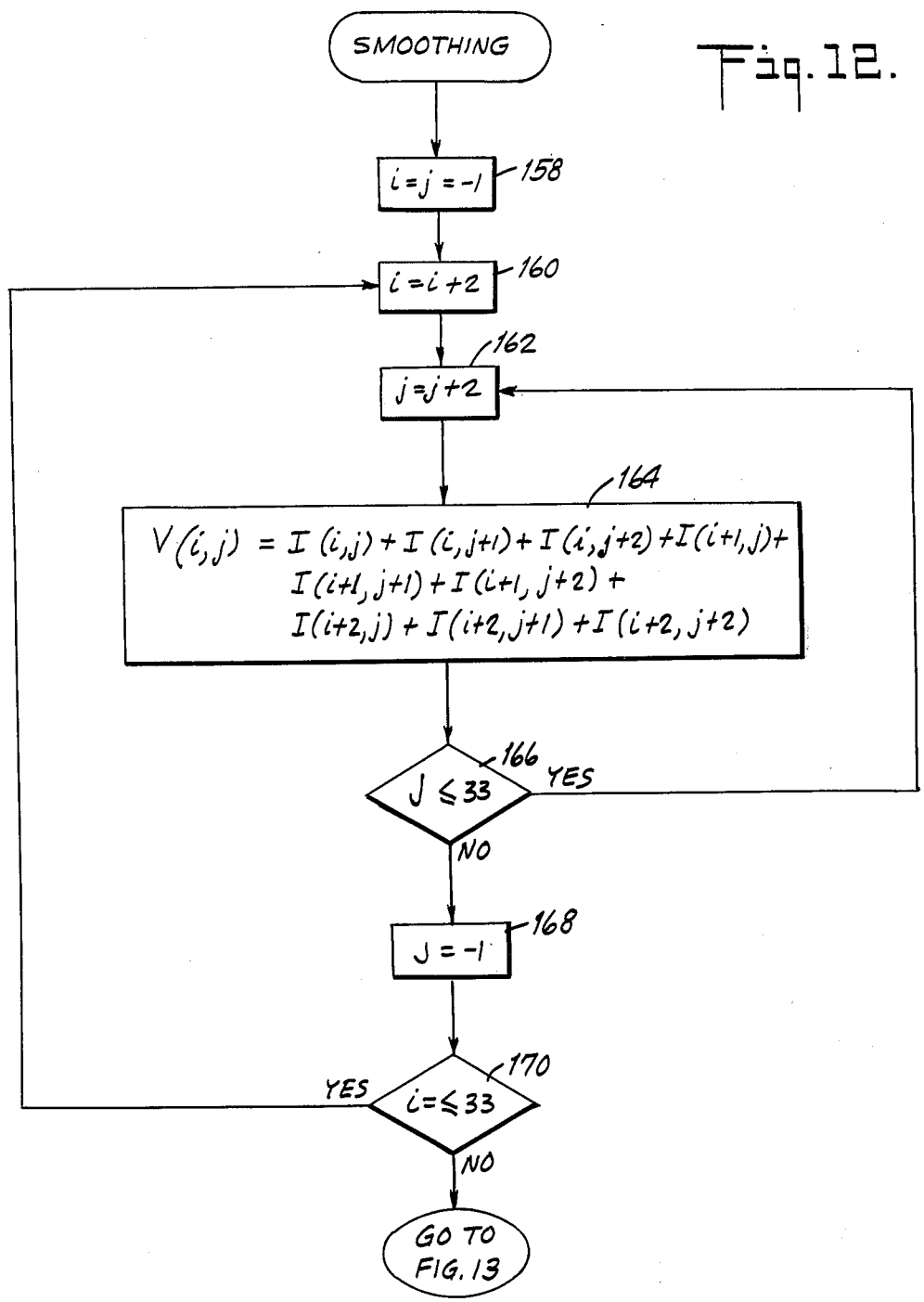
FIG. 12 is a flow chart illustrating the smoothing of the digital signal derived from scanning a marking.

After the intensity values $i_{i,j}$ have been derived for the 35 × 35 array of points overlapping the marking which is being inspected, the intensity values are smoothed as described earlier so as to eliminate certain irrelevant factors. In smoothing, the 35 × 35 array of points is reduced to a 17 × 17 array in the manner described in connection with FIG. 4. Specifically, the value of every other point in the 35 × 35 array is replaced by the average (or sum) of its value and the value of the 8 surrounding points. Referring to FIG. 12, the smoothing procedure starts at 158 by setting each of the indices $i$ and $j$ to $-1$. All values of $i$ and $j$ are referred to the starting address of the 35 × 35 array of intensity values. At 160 the index $i$ is incremented by 2 and at 162 the index $j$ is incremented by 2, to make the current value of the indices identify the point at the upper left corner of the 35 × 35 array. At 164 the value $V_{i,j}$ is found in accordance with the indicated expression, and at 166 a test is made to see if the current point is in a column for which a smoothed value can be computed. If it is, a return is made to 162 to proceed to the next even numbered point of the 35 × 35 array in the $j$ direction. If the test at 166 indicates that a row of the 35 × 35 array has been processed in this manner, the index $j$ is reset to $-1$ at 168, and a test is made at 170 to see if the 35 × 35 array has been exhausted in the $i$ direction. If it has not been, a return is made to 160 to increment the row number by 2, so as to process another row in this manner. When the answer at 170 is no, meaning that the last appropriate row of the 35 × 35 array of intensity values $I_{i,j}$ has been processed, control is transferred to the procedure shown at FIG. 13. At this time the 17 × 17 array of smoothed intensity values $V_{i,j}$ has been generated. Note that at this time the array is still 35 × 35, but that only the points with both indices odd-numbered are of significance. Groups of more than 9 points may be averaged for smoothing. The general rule, in order to have the smoothed array compatable with the quantization and transformation techniques of this invention, is to have the smoothed array be $(2^\eta + 1) \times (2^\eta + 1)$, where $\eta$ is an integer greater than 1.

Figure 13:
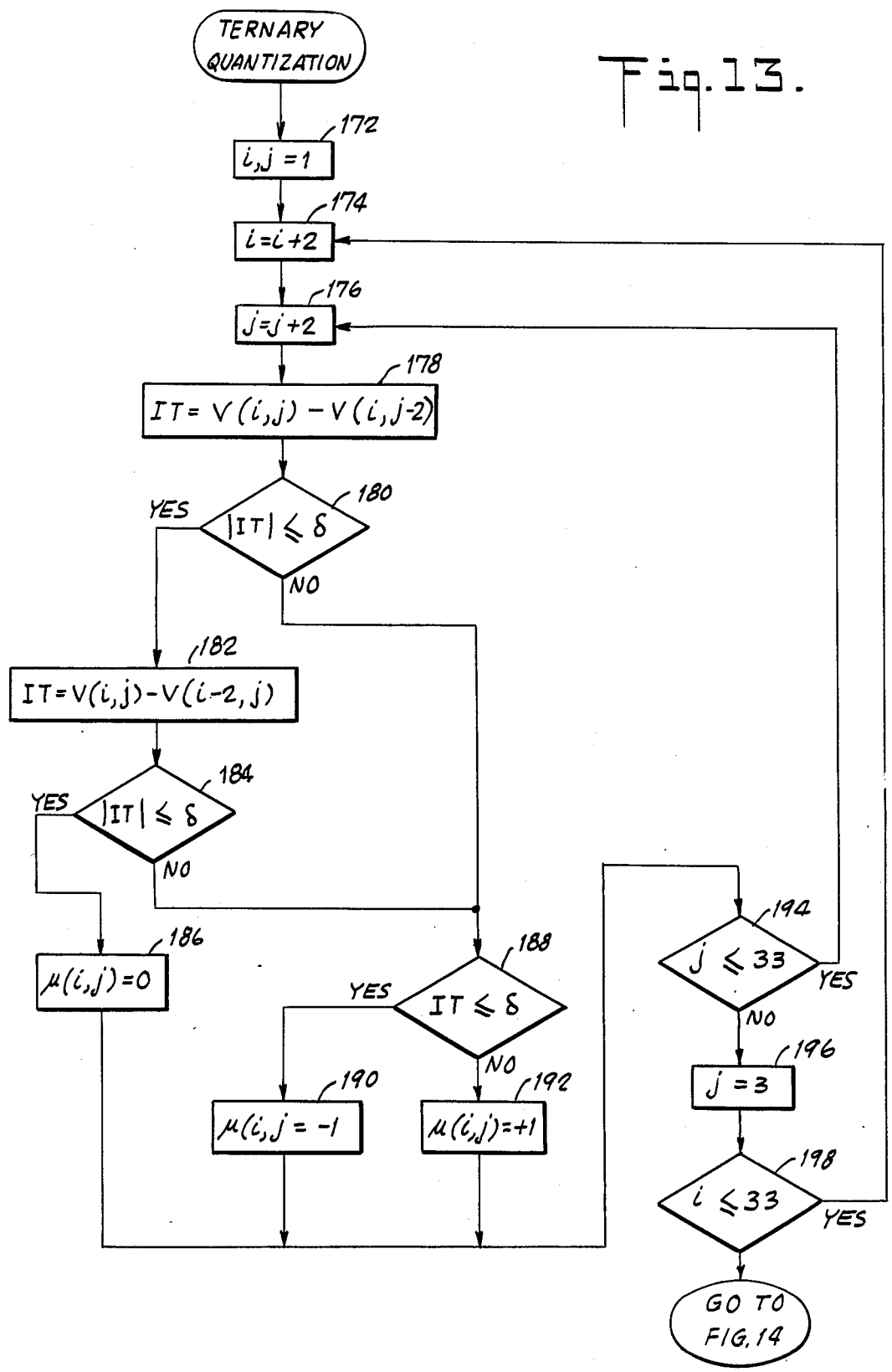
FIG. 13 is a flow chart illustrating the ternary quantization of the digital signal derived by scanning a marking.

Referring to FIG. 13 for a detailed explanation of the ternary quantization procedure, the start is at 172 where the indices $i$ and $j$ are each set to 1. At 174 the index $i$ is incremented by 2 and at 176 the index $j$ is incremented by 2 to identify the point of the 35 × 35 array which is third from top and from left. The value of the quantity IT is then found at 178 in accordance with the indicated expression, and at 180 the absolute value of the quantity IT is compared with a threshold $\delta$ which has been previously selected. This is the same threshold $\delta$ which was previously discussed in connection with FIG. 7. If the absolute value of the quantity IT is less than or equal to $\delta$, the value of IT is reset at 182 in accordance with the indicated expression, and a new test is carried out at 184 to compare the absolute value of the new quantity IT to the value of the threshold $\delta$. If the absolute value at 184 is less than or equal to the threshold value, the corresponding ternary value is set to zero at 186. If the answer either at 180 or at 184 is no, a test is made at 188 by comparing the quantity IT (not its absolute value) with the same threshold. If the algebraic value of the quantity IT is less than or equal to the threshold value, the corresponding point of the array is set to $-1$ at 190 and if the algebraic value of IT is greater than the threshold value the corresponding point of the array is set to $+1$ at 192. A test is made then at 194 to determine if the examined column can still produce a ternary value; if it can, a return is made to 176; if not the index $j$ is reset to 3 at 196; a test is made at 198 to see if the current row is within the array, and if yes, a return is made to 174. If the array has been entirely processed as described above, the answer at 198 is no and a transfer is made to the procedure shown at FIG. 14. Note again that the $i,j$ indices again identify a 35 × 35 array but that only 16 × 16 points of it are significant. The quantization reduces the array of significant sample points from 17 × 17 to 16 × 16.

Figure 14:
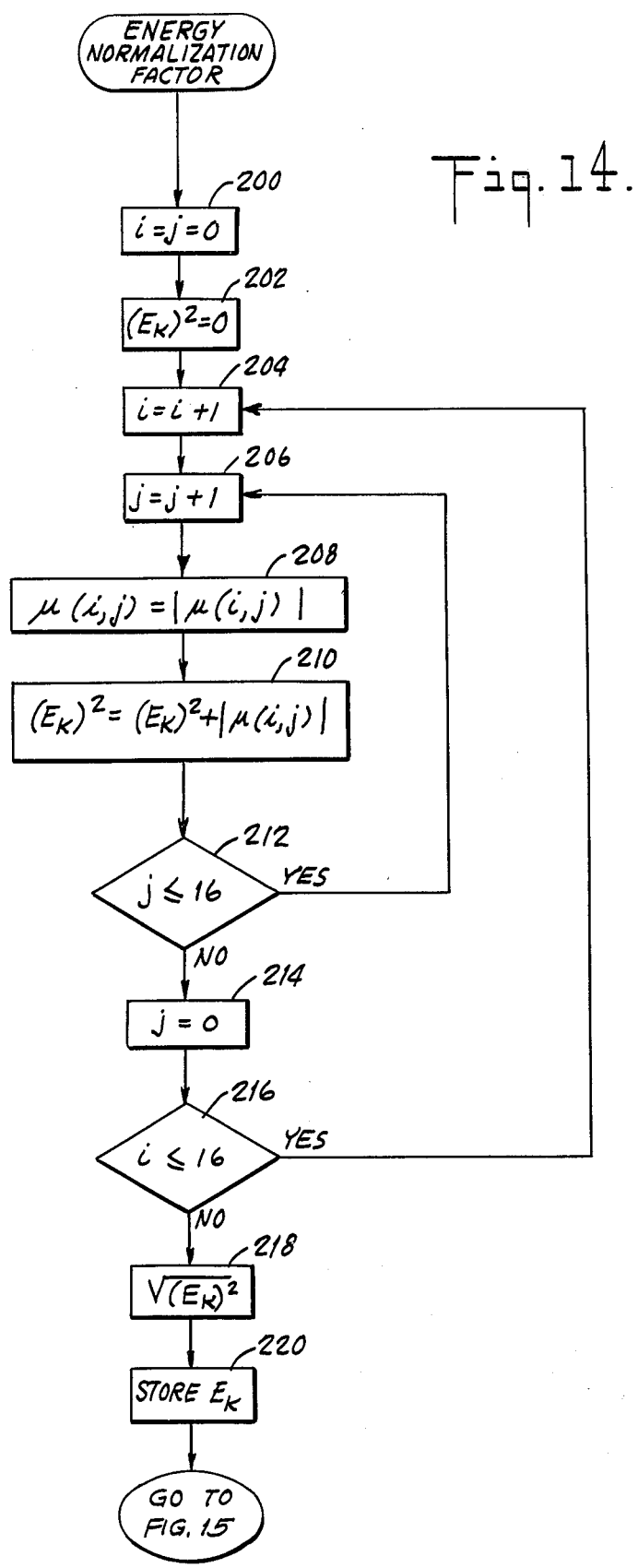
FIG. 14 is a flow chart illustrating the derivation of the energy normalization factor.

Referring to FIG. 14, the purpose of the procedure is to compute the value of the energy normalization coefficient $E_K$ from the 16 × 16 array of ternary values. At 200 the indices $i$ and $j$ are set to zero. Note that while the indices $i$ and $j$ in the preceeding figure referred to a 35 × 35 array of points, the indices at FIG. 14 refer to the 16 × 16 array of ternary values and each ranges from 1 to 16. The value of $E_K^2$ is set to zero at 202, and the indices $i$ and $j$ are incremented by 1 at 204 and 206 respectively. At 208 the absolute value of the current ternary value is found and at 210 this absolute value is used in the indicated expression to find a current value for the quantity $E_K^2$. A test is made at 212 to determine if the current column of the 16 × 16 array is still within the array, and if yes a return is made to 206. If the last column has been processed a test at 212 transfers control to 214 where the index $j$ is reset to zero, a test is made at 216 to determine if the current row is within the 16 × 16 array and if yes control is transferred back to 204 to start processing a new row. When all the rows and columns have been processed in this manner, the square root of the quantity $E_K^2$ is extracted at 218, the sought energy normalization coefficient $E_K$ is stored at 220, and a transfer is made to the procedure of FIG. 15.

After the 16 × 16 array of ternary values has been found as discussed above, the needed components of a special type of a reduced Walsh/Hadamard transform are found in accordance with the procedure shown in FIG. 15. The indicated 16 function values are found at each of 222, 224, 226 and 228 in accordance with the indicated summing operations, and then the one-dimensional Walsh/Hadamard function of each of the four sets of 16 values each is found in accordance with a procedure of the type outlined at Pratt, W. K. et el., *Hadamard Transform Image Coding., IEEE Proceedings*, Vol. 57, No. 1, pp 58–68, January 1969. Specifically, the 16 values from 222 are processed at 230 as a one-dimensional Walsh/Hadamard transform to provide the first (the leftmost) column of 16 Walsh/Hadamard components for storage at 232. Similarly, the 16 values from 224 are processed at 234 to provide the first 8 (the 8 lowest sequency) Walsh/Hadamard components of the second column. The first 8 (lowest sequency) Walsh/Hadamard components of the first row are provided from transforming the output of 226 at 236, and the first 8 (lowest sequency) Walsh/Hadamard components of the second row are provided by processing the output of 228 at 238. Note that the first two components of the first and second rows need not be provided by 236 and 238 respectively because these have already been provided from 230 and 234. The result is a set of 36 Walsh/Hadamard transform components stored at 232.

Referring to FIG. 16, the transform components derived in the procedure of FIG. 15 are each divided at 240 by the previously derived (FIG. 14) energy normalization factor $E_K$ to complete the energy normalization discussed above, and a test is made at 242 to determine whether the transform components are to be used for prototypes or for identifying new markings. If the components are for the prototype storage, each component is stored in a correspondingly numbered location of the prototype storage at 244. Note that the storage location of each prototype component stores the average of any plurality of like-numbered components resulting from a corresponding plurality of prototype markings. Thus, in the case of 10 different prototypes (e.g., the 10 decimal digits) there are 10 sets of storage locations, each set comprising 36 locations numbered 1 through 36. The first Walsh/Hadamard component of a marking manually identified as being, say, a decimal 6 is stored in the first location of the set corresponding to decimal 6, the second component is stored in the second location, etc. If any of the locations has any components previously stored in it, the new component is averaged with the existing contents of the location and the average is stored back at the same location. Note again that the training markings for prototypes do not have to be presented for inspection in any particular order, e.g., there is no need to present all ones, then all twos, etc., since the identity of each training prototype is input to the system by an operator at the time the marking is inspected. After the components for a prototype marking have been stored at 244, a test is made at 246 to determine if this should be the end of the system operation, and if yes, the system is turned off at 248. If not, control is transferred to 250 for proceeding to a new marking brought to the inspection position 22. If the test at 242 indicates that the transform components are to be used for identifying the marking, the Eucledian distance is found at 252 between the new marking and each of the prototype markings. Other types of distance functions can be used. In the case of using 36 transform components for each of the decimal digits, each of the 10 prototype digits is uniquely associated with a point in 36 dimensional space and the procedure at 252 involves finding the distance in 36-dimensional space between the point associated with the new marking and each of the points associated with the prototype digits. At 254 the least of the Eucledian distances found at 250 is compared with every other distance multiplied by a reject factor K, which is selected to be greater than zero but less than 1. The purpose of this is to ensure that only clearly recognizable markings are identified and that inherently ambiguous markings are not incorrectly identified as recognized markings but are instead rejected as not readable. The procedure at 254 in effect imposes a requirement that a marking be not only more like one of the prototypes than any other prototype but also that it be more like one prototype than any other prototype by a factor determined by the constant K. Because of this requirement at 254, there is a reject region whose area increases with decreased likeness between the marking under inspection and prototypes. For example, because of the test at 254, a marking which is somewhat more like one prototype than another, but is not very close to either prototype is rejected while a marking which is very close to two prototypes but closer to one than to the other is correctly identified. In contrast to the commonly used additive reject constant, a multiplicative constant (as used in this invention) requires that markings distant from all prototypes be less ambiguous if they are to be identified and not rejected. If the test at 254 is not satisfied, a reject is indicated at 256, but if the test at 254 is satisfied the marking under inspection is identified at 258 as identical to the prototype having the least Eucledian distance to the marking under inspection. A test is made at 246 to see if the procedure should be ended, and if so the procedure is ended at 248. If the procedure is not to be ended, the system proceeds to another marking at 250, this other marking is indexed with the inspection position 22 and the procedure illustrated in FIGS. 9-16 starts again and proceeds generally as described above. If there is a sequence of markings at the inspection position 22 rather than a single marking, the system returns to a procedure of the type shown in FIG. 11 to look at a new portion of the field of the imaging device 28.

The system described above may additionally include prototype modification if it is needed to improve recognition. The prototype modification can be of the type described in Carl, W. C. et al., *The Application of Filtered Transforms to the General Classification Problem,* IEEE Trans. on Computers, Vol. C-21, No. 7, July 1972, pp 785-790. The difference from the Carl technique is that instead of cycling a tape or other record of sample markings to the inspection system, which would require a mass storage device, the actual sample markings are cycled through the inspection device 28 in this invention, thereby simplifying the prototype modification.

While only markings on workpieces have been discussed in the specific embodiment of the invention as described in detail above, it should be clear that the generic term "marking" includes images of markings, and articles or images of articles rather than only markings on articles, and that the invented system can be used to detect the general outline and pattern of such images and articles, or images of articles. For example, rather than inspecting markings on workpieces the invented system can inspect workpieces or articles (or images thereof) to determine if the workpieces and articles are sufficiently consistent with previously inspected sample workpieces or articles or to identify the closest such sample workpiece or article. As one illustrative example, the invented system can be used to inspect not successive markings on workpieces but successive articles (or images thereof) such as automobile engines emerging from an assembly station where carburators are attached to them, and can be trained to distinguish between engines with carburators and those without carburators, thus serving as a quality control station. The number of transform components that are actually used may be reduced to a lower number in the case of discriminating between markings or articles which are only in a few categories that are greatly different from each other, such as the case of the two categories of engines with and without carburators.

With respect to the alternate embodiment of the invention discussed above, it should be clear that certain of the techniques described in terms of a specially programmed, general purpose digital computer can of course be implemented in hardware, and that such hardware implemented techniques can be made a part of the alternate embodiment of the invention, taking the place of the described software implemented techniques, or can be made a part of the hardware embodiment of the invention described in the earlier portion of this specification.

I claim:

1. A method of inspecting articles comprising the steps of:
    detecting optoelectrically each article to derive an electrical signal and including a component for each point of a multpoint array which overlaps the article;
    combining successive components of the electrical signal to derive a quantized signal which identifies selected characteristics of the electrical signal but is substantially different from the electrical signal;
    transforming the quantized signal to derive selected components only of a multicomponent transformed signal, each of the transformed signal components being a combination of a selected multiplicity of components of the quantized signal, and forming said selected components of the transformed signal into an extracted signal representing selected features only of the article, said selected features emphasizing more of the lower than of the higher resolution characteristics of the article;
    providing a plurality of prototype signals corresponding to similarly derived selected features of a plurality of sample articles; and
    combining the extracted signal with the prototype signals to detect correspondence therebetween.

2. A method as in claim 1 where the step of combining components of the electrical signal to derive a quantized signal comprises deriving a ternary level quantized signal identifying selected transitions between levels of the electrical signal and the transforming step comprises transforming the ternary level quantized signal by a selected multielement matrix transformation to derive a nonconformally transformed signal comprising components each representing an aspect of at least a substantial portion of the entire article rather than of a portion of the article which is small as compared to the entire article.

3. A method as in claim 2 where the transforming step comprises transforming the quantized signal by a selected reduced Walsh/Hadamard transformaton to derive a transformed signal comprising selected components only of the Walsh/Hadamard function of the quantized signal.

4. A method as in claim 2 wherein the step of combining the extracted signal with the prototype signals comprises deriving a signal identifying the prototype signal that most closely corresponds to the extracted signal and a signal identifying the sample article corresponding to the last recited prototype signal.

5. An industrial inspection method comprising the steps of:
    providing workpieces having identifying markings and defining an inspection position;
    registering the markings of successive workpieces and the inspection position with each other;
    optoelectrically detecting each marking registered with the inspection position to derive an electrical signal representing the marking;
    quantizing the electrical signal to derive a multicomponent, ternary level quantized signal in accordance with the presence and absence of selected transitions in the electrical signal rather than to the presence and absence of a selected level in the electrical signal;
    transforming the quantized signal by repeatedly combining components thereof with each other to derive selected components only of a transformed signal having a plurality of components each resulting from combining a multiplicity of components of the quantized signal, and forming said selected components of the transformed signal into an extracted signal representing selected features only of the marking;
    providing a plurality of prototype signals representing corresponding selected features of a plurality of prototype markings; and
    combining the extracted signal with the prototype signals to detect the degree of correspondence between the extracted signal and each of a plurality of the prototype signals.

6. An industrial inspection method as in claim 5 where the transforming step comprises deriving each of said components of the transformed signal as a function of an aspect of at least a substantial portion of the entire marking rather than of a small portion of the marking.

7. An industrial inspection method as in claim 6 where the step of deriving said selected components on the transformed signal comprises extracting primarily low resolution components of the transformed signal to derive thereby an extracted signal primarily representing low resolution features of the marking.

8. An industrial inspection method as in claim 7 where the step of providing prototype signals comprise selectively forming each prototype signal from a plurality of extracted signals derived successively from successive workpieces having known markings.

9. An industrial inspection method as in claim 5 where each marking comprises shaped surface irregularities on a selected surface of the workpiece, said surface irregularities being made of substantially the same material as said selected surface of the workpiece.

10. An industrial inspection method comprising the steps of:
providing workpieces having markings and defining an inspection position;
registering the markings of successive workpieces and the inspection position with each other;
deriving an electrical signal representing each marking registered with the inspection position;
locally smoothing selected components of the electrical signal as a function of other selected components of the signal to derive a smoothed electrical signal;
quantizing the smoothed electrical signal to derive a ternary level quantized signal corresponding thereto;
transforming the quantized signal by a selected multielement matrix transformation to derive selected components only of a transformed signal comprising components each representing an aspect of the entire marking rather than of a small area thereof; and forming said selected components of the transformed signal into an extracted signal representing selected features only of the marking;
providing a plurality of prototype signals representing corresponding selected features of a plurality of prototype markings; and
combining the extracted signal with the prototype signals to detect correspondence therebetween.

11. An industrial inspection method as in claim 10 where the transforming step comprises deriving a transformed signal representing a selected nonconformal Walsh/Hadamard transform of the quantized signal.

12. An industrial inspection method as in claim 11 where the step of providing the prototype signals comprises selectively forming each prototype signal from a plurality of extracted signals derived from workpieces having selected known markings.

13. An industrial inspection method as in claim 12 where said markings are defined by shaped surface irregularities on selected surfaces of the workpieces, said surface irregularities being of substantially the same material as said selected surfaces of the workpieces.

14. An industrual inspection method as in claim 12 where the step of combining the extracted signal with the prototype signals includes identifying the prototype signal most closely corresponding to the extracted signal and identifying the prototype marking corresponding to the last recited prototype signal, thereby identifying the marking registered with the inspection position.

15. A method of inspecting workpieces comprising the steps of:
providing workpieces having markings at surfaces thereof formed by surface irregularities caused by displaced portions of said surfaces;
providing an inspection position;
registering the markings of successive workpieces and the inspection position with each other;
detecting optoelectrically each marking registered with the inspection position to derive an electrical signal corresponding to the marking, said electrical signal including a component for each point of a multipoint array which overlaps the marking;
locally smoothing the components of the electrical signal for selected points of the array in accordance with the components for selected adjacent points of the array to derive a smoothed electrical signal;
quantizing the smoothed electrical signal to derive a ternary level quantized signal in accordance with defined transitions in the smoothed signal;
transforming the quantized signal by a selected multielement matrix transformation to derive a transformed signal comprising components each representing an aspect of the entire marking rather than of a small area of the marking and extracting selected components only of the transformed signal to derive an extracted signal corresponding to selected features only of the marking;
providing a plurality of prototype signals representing corresponding selected features of a plurality of prototype markings; and
combining the extracted signal with the prototype signals to detect correspondence therebetween.

16. A method as in claim 15 including the step of energy normalizing at least selected components of the transformed signal.

17. A method as in claim 16 where the the transforming step comprises transforming the quantized signal by a selected Walsh/Hadamard transformation of the components of the quantized signal.

18. A method as in claim 17 where the step of providing the prototype signals includes forming a prototype signal from a plurality of extracted signals derived from workpieces having selected known markings.

19. A method as in claim 18 where said markings are defined by shaped depressions into said surfaces of the workpieces.

20. A method as in claim 15 where the transforming step comprises transforming the quantized signal by a selected Walsh/Hadamard transformation of the components of the quantized signal.

21. A method as in claim 20 where the step of providing the prototype signals includes forming each prototype signal from a plurality of extracted signals derived from workpieces having selected known markings.

22. A method as in claim 15 where the transformed signal components span a range of resolutions of the marking and the step of extracting selected components on the transformed signal comprises weighting lower resolution components of the transformed signal substantially more than higher resolution components thereof to thereby deemphasize at least a substantial proportion of the higher resolution characteristics of the marking.

23. A system for inspecting workpieces having markings comprising:
- means for detecting each marking of said workpieces to derive an electrical signal representing the marking and including a component for each point of a multipoint array which overlaps the marking;
- means for quantizing the electrical signal to derive a ternary level quantized signal which identifies each transition between selected levels in the electrical signal;
- means for transforming the quantized signal to derive selected components only of a multicomponent transformed signal, each of the transformed signal components being a combination of a selected multiplicity of components of the quantized signal, and means for forming said selected components of the transformed signal into an extracted signal representing selected features only of the marking, said selected features emphasizing lower resolution characteristics of the marking;
- means for providing a plurality of prototype signals representing corresponding selected features of a plurality of prototype markings; and
- means for combining the extracted signal with the prototype signals to detect correspondence therebetween.

24. A system as in claim 23 wherein the means for quantizing the electrical signal comprise means for deriving a ternary level quantized signal and the transforming means comprise means for nonconformally transforming the ternary level quantized signal by a selected multielement matrix transformation to derive a transformed signal comprising components each representing an aspect of at least a substantial portion of the entire marking rather than of a small portion of the marking.

25. A system as in claim 24 wherein the transforming means comprise means for transforming the quantized signal by a selected Walsh/Hadamard transformation to derive a transformed signal comprising selected components only of the selected Walsh/Hadamard function of the quantized signal.

26. A system as in claim 24 wherein the means for combining the extracted signal with the prototype signals comprise means for deriving a signal identifying the prototype signal that most closely corresponds to the extracted signal and a signal identifying the prototype marking corresponding to the last recited prototype signal.

27. An industrial inspection system comprising:
- means for providing workpieces having identifying markings;
- means for defining an inspection position;
- means for registering the markings of successive workpieces and the inspection position with each other;
- means for optoelectrically detecting each marking registered with the inspection position to derive an electrical signal representing the marking;
- means for quantizing the electrical signal to derive a multicomponent, ternary level quantized signal in accordance with the presence and absence of selected transitions in the electrical signal;
- means for transforming the quantized signal by repeatedly combining components thereof to derive selected components only of a transformed signal having a plurality of components each resulting from combining a multiplicity of components of the quantized signal, and means for forming said selected components of the transformed signal into an extracted signal representing selected features only of the marking;
- means for providing a plurality of prototype signals representing corresponding selected features of a plurality of prototype markings; and
- means for combining the extracted signal with the prototype signals to detect the degree of correspondence between the extracted signal and each of a plurality of prototype signals.

28. An industrial inspection system as in claim 27 wherein the transforming means comprise means for deriving each of said selected components of the transformed signal as a function of an aspect of at least a substantial portion of the entire marking rather than of a small portion of the marking.

29. An industrial inspection system as in claim 28 where the transformed signal has low and high resolution components and wherein the means for deriving selected components only of the transformed signal comprise means for emphasizing lower resolution components of the transformed signal and deemphasizing higher resolution components thereof to derive thereby an extracted signal with greater emphasis on lower resolution features of the marking.

30. An industrial inspection system as in claim 29 wherein the means for providing prototype signals comprise means for forming each prototype signal from a plurality of extracted signals derived successively from successive workpieces having known markings registered with the inspection position.

31. An industrial inspection system as in claim 27 wherein each marking comprises means defining shaped surface irregularities on a selected surface of the workpiece, said surface irregularities being made substantially of the same material as said selected surface of the workpiece.

32. An industrial inspection system comprising:
- means for providing workpieces having markings;
- means for defining an inspection position;
- means for registering the markings of successive workpieces and the inspection position with each other;
- means for detecting each marking registered with the inspection position to derive an electrical signal representing the marking;
- means for locally smoothing selected components of the electrical signal as a function of other selected components of the signal to derive a smoothed electrical signal;
- means for quantizing the smoothed electrical signal to derive a ternary level quantized signal corresponding thereto;
- means for nonconformally transforming the quantized signal by a selected multielement matrix transformation to derive selected components only of a transformed signal comprising components each representing an aspect of the entire marking rather than of a small area thereof, and means for forming said selected components of the transformed signal into an extracted signal representing selected features only of the marking;
- means for providing a plurality of prototype signals representing corresponding selected features of a plurality of prototype markings; and means for combining the extracted signal with the prototype signals to detect correspondence therebetween.

33. An industrial inspection system as in claim 32 wherein the means for detecting the markings comprise means for deriving an electrical signal including a component representing the brightness of each point of a multipoint array overlapping the markings.

34. An industrial inspection system as in claim 33 wherein the transforming means comprise means for deriving a transformed signal representing a selected Walsh/Hadamard transform of the quantized signal.

35. An industrial inspection system as in claim 34 wherein the means for providing the prototype signals comprise means for selectively forming each prototype signal from a plurality of extracted signals derived from workpieces having selected known markings.

36. An industrial inspection system as in claim 35 wherein said markings are defined by shaped surface irregularities on selected surfaces of the workpieces, said surface irregularities being of a material similar to that forming said selected surfaces of the workpieces.

37. An industrial inspection system as in claim 36 wherein the means for combining the extracted signal with the prototype signals include means for identifying the prototype signal most closely corresponding to the extracted signal and for identifying the prototype marking corresponding to the last recited prototype signal, thereby identifying the marking registered with the inspection position.

38. An industrial inspection system comprising:
means for providing workpieces having markings at surfaces thereof formed by surface irregularities of a material similar to the material forming said surfaces;
means for registering the markings of successive workpieces and an inspection position with each other;
means for detecting each marking registered with the inspection position to derive an electrical signal corresponding to the marking, said electrical signal including a component for each point of a multipoint array which overlaps the marking;
means for locally smoothing the components of the electrical signal for at least selected points of the array in accordance with the components for selected adjacent points of the array to derive a smoothed electrical signal;
means for quantizing the smoothed electrical signal to derive a ternary level quantized signal representing defined transitions in the smoothed signal;
means for transforming the quantized signal by a selected multielement matrix transformation to derive a transformed signal comprising components each representing an aspect of the entire marking rather than of a small area of the marking;
means for extracting selected components of the transformed signal to derive an extracted signal corresponding to selected features only of the marking;
means for providing a plurality of prototype signals representing corresponding selected features of a plurality of prototype markings; and
means for combining the extracted signal with the prototype signals to detect correspondence therebetween.

39. An industrial inspection system as in claim 38 including means for energy normalizing at least selected components of the transformed signal.

40. An industrial inspection system as in claim 39 where the transforming means comprise means for transforming the quantized signal by a selected Walsh/Hadamard transformation of the components of the quantized signal.

41. An industrial inspection system as in claim 40 where the means for providing the prototype signals include means for forming a prototype signal from a plurality of extracted signals derived from workpieces having selected prototype markings.

42. An industrial inspection system as in claim 41 wherein said markings are defined by shaped depressions into said surfaces of the workpieces.

43. An industrial inspection system as in claim 38 wherein the transforming means comprise means for transforming the quantized signal by a selected Walsh/Hadamard transformation of the components of the quantized signal.

44. An industrial inspection system as in claim 43 wherein the means for providing the prototype signals include means for forming each prototype signal from a plurality of extracted signals derived from workpieces having selected known markings.

45. An industrial inspection system as in claim 38 where the workpiece markings are defined by shaped depressions into said surfaces.

46. An industrial inspection system as in claim 38 where the transformed signal has low and high resolution components and where the means for extracting selected components of the transformed signal comprise means for selecting primarily the low resolution components of the transformed signal and for eliminating at least a substantial number of the higher resolution components thereof.

* * * * *